(12) United States Patent
Kasuya

(10) Patent No.: US 7,594,872 B2
(45) Date of Patent: Sep. 29, 2009

(54) AUTOMATIC SHIFT TYPE MANUAL TRANSMISSION

(75) Inventor: Yusuke Kasuya, Aichi (JP)

(73) Assignee: Aichi Machine Industry Co., Ltd., Aichi (JP)

( * ) Notice: Subject to any disclaimer, the term of this patent is extended or adjusted under 35 U.S.C. 154(b) by 540 days.

(21) Appl. No.: 10/581,868

(22) PCT Filed: Oct. 4, 2004

(86) PCT No.: PCT/JP2004/014987

§ 371 (c)(1),
(2), (4) Date: Jun. 5, 2006

(87) PCT Pub. No.: WO2005/054721

PCT Pub. Date: Jun. 16, 2005

(65) Prior Publication Data

US 2007/0142153 A1 Jun. 21, 2007

(30) Foreign Application Priority Data

Dec. 5, 2003 (JP) ............................. 2003-406714

(51) Int. Cl.
*F16H 59/02* (2006.01)
(52) U.S. Cl. .................... 475/335; 74/473.3; 74/473.33
(58) Field of Classification Search ................... 74/335, 74/473.3, 473.31, 473.32, 473.33
See application file for complete search history.

(56) References Cited

U.S. PATENT DOCUMENTS 2,028,205 A * 1/1936 Hahn ....................... 192/219.3
2,180,019 A * 11/1939 Peterson ....................... 74/359
2,853,889 A * 9/1958 Quayle ..................... 74/473.24

* cited by examiner

*Primary Examiner*—Ha D. Ho
(74) *Attorney, Agent, or Firm*—Cooper & Dunham, LLP

(57) ABSTRACT

An automatic shift manual transmission equipped with a forward shifter for forward stage shifting, a reverse shifter for reverse stage shifting, an actuator rod carrying the forward shifter and the reverse shifter, and an actuator to operate the actuator rod according to shift operations of a shift lever, wherein a shifter length of the reverse shifter is substantially the same as the that of the forward shifter, and a reverse stage shift stroke is greater than a forward stage shift stroke by the difference in an operating measurement of the actuator rod.

14 Claims, 20 Drawing Sheets

1. automatic shift type manual transmission    3. actuator
4. reverse shifter 1. automatic shift type manual transmission    3. actuator
4. reverse shifter (a)

(b)

AUTOMATIC SHIFT TYPE MANUAL TRANSMISSION

FIELD OF THE INVENTION

The present invention relates to an automatic shift type manual transmission.

BACKGROUND OF THE INVENTION

Hitherto, the constant mesh type shifting mechanism has been employed for forward stage shifting, and the sliding selective type shifting mechanism has been employed for reverse stage shifting in the conventional automobile transmission.

In said conventional transmission, the. stroke measurement in forward stage shifting is comparatively small, while the stroke measurement in reverse stage shifting is relatively large. Accordingly, for a shifting mechanism of the transmission to increase the stroke measurement in reverse stage shifting, in comparison to that in the forward stage shifting, the first and second lever parts projecting parallel to the shift shaft side, are equipped on the shift and select levers, the length of either the first lever part or the second lever part being set to be greater, so as to use said lever part exclusively for changing to the reverse stage (see Tokkai Hei 11-287324, pages 3 to 6, FIG. 1).

In said conventional structure, however, either the first lever part or the second lever part of the shift and select lever should be long, making downsizing of the transmission difficult.

To solve said problem, it has been considered that the lengths of both lever parts are set to be substantially the same, with the inversion lever mechanism being equipped in the shift and select levers, to increase the stroke measurement in reverse stage shifting compared to that in forward stage shifting. Nevertheless, in said concept, there is a problem in that the structure becomes complicated.

DISCLOSURE OF THE INVENTION

As a means to solve said problems of the conventional transmission, the present invention provides an automatic shift type manual transmission 1, equipped with a forward shifter 12 to perform forward stage shifting, a reverse shifter 4 to perform reverse stage shifting, an actuator rod 3 carrying said forward shifter 12 and said reverse shifter 4, and an actuator 2 to operate said actuator rod 3 according to the shift operation of the shift lever, wherein the shifter length L of said reverse shifter 4 is set to be substantially the same as the shifter length L of said forward shifter 12, and reverse stage shift stroke measurement 2S is set to be comparatively larger than the forward stage shift stroke measurement S by allowing a difference in the operating measurement of said actuator rod 3.

In said transmission, said actuator rod 3 is preferably set to be rotated by said actuator 2 according to the shift operation of said shift lever, the neutral position of said reverse shifter 4 being set to be in a position pivoting toward one side from a vertical position to said actuator rod 3, with the reverse position of said reverse shifter 4 being set to be in a position pivoting toward the other side from a vertical position to said actuator rod 3. Further, the neutral position of said forward shifter 12 is preferably set to be in a vertical position to said actuator rod 3, the first stage side shift position of said forward shifter 12 being set to be in a position pivoting toward one side from a vertical position to said actuator rod 3, with the second stage side shift position being set to be in a position pivoting toward the other side from a vertical position to said actuator rod 3.

Furthermore, the rotation angle 2θ of said reverse shifter 4 from the neutral position to the reverse position is preferably set to be substantially the same as the rotation angle 2θ of said forward shifter 12 from the first stage side shift position to the second stage side shift position.

Still further, the rotation angle θ of said reverse shifter 4 to neutral position is preferably set to be substantially the same as the rotation angle θ of said reverse shifter to the reverse position.

In said transmission 1, although the length L of said reverse shifter 4 is set to be substantially the same as the length L of said forward shifter 12, without conventional inversion lever mechanism being equipped in the shift and select lever, the shift stroke measurement 2S during reverse stage shifting can be increased in comparison to the shift stroke measurement during forward stage shifting, by allowing a difference in the operating measurement of said actuator rod 3, so that downsizing of the transmission can be realized and structural complications can be prevented.

The present invention also provides an automatic shift type manual transmission 1 equipped with a shifter 16 to perform shifting, an actuator rod 3 carrying said shifter 16, an actuator 2 to operate said actuator rod 3 according to the shift operation of the shift lever, and a drive control system to control the operation of said actuator 2 so that the operating measurement of said actuator rod 3 when shifting toward the second stage side is performed, is set to be larger than the operating measurement of said actuator rod 3 when shifting toward the first stage side is performed.

In said transmission, said actuator rod 3 is preferably set to be rotated by said actuator 2 accordingly to the shift operation of said shift lever, with said drive control system driving and controlling said actuator 2 so that the rotation angle 2θ of said actuator rod 3 when shifting toward the second stage side is performed is set to be larger than the rotation angle θ of said actuator rod 3 when shifting toward the first stage side is performed.

Further, said drive control system is preferably set to control said actuator 2 so that the neutral position in the second stage side of said shifter 16 pivots toward one side from a vertical position to said actuator rod 3 and the shift position in the second stage side pivots toward the other side from a vertical position to said actuator rod 3 when shifting toward the second stage side is performed.

Furthermore, said drive control system is preferably set to control said actuator 2 so that the neutral position in the first stage side of said shifter 16 is set to be in a position vertical to said actuator rod 3 when shifting toward the first stage side is performed, and the position of said shifter 16 in the first stage side is set to be in a position pivoting toward one or the other side from a vertical position to said actuator rod 3.

Still further, said drive control system is preferably set to control said actuator 2 so that when shifting toward the second stage side is performed, the rotation angle 2θ of said actuator rod 3 from the neutral position in the second stage side to the shift position in the second stage side is set to be substantially the same as the rotation angle 2θ of said shifter 16 from a position pivoting toward one side from a vertical position to said actuator rod 3 to a position pivoting toward the other side from a vertical position to said actuator rod 3 when shifting toward the first stage side is performed.

In addition, said drive control system is preferably set to control said actuator 2 so that when shifting toward the second stage side is performed the rotation angle θ of said shifter 16 from a vertical position to said actuator rod 3 to the neutral position in the second stage side is set to be substantially the same as the rotation angle θ of said shifter 16 from a vertical position to said actuator rod 3 to the position of said shifter in the second stage side.

Additionally, said shifter 16 preferably includes the first shifter 12 to perform shifting toward the first stage side, and the second shifter 4 to perform shifting toward the second stage side.

Addition to this, the length L of said first shifter 12 is preferably set to be substantially the same as the length L of said second shifter 4.

Further, the first stage side is the forward shifting stage, and the second stage side is the reverse shifting stage.

In said automatic shift type manual transmission, since the operating measurement of said actuator rod 3 in the second stage shifting operation is set to be larger in comparison to the operating measurement of said actuator rod 3 in the first stage shifting operation, by driving and controlling said actuator 2, using said drive control system, the length of said shifter for first stage shifting can be set to be substantially the same as the length of said shifter for second stage shifting, and the downsizing of said transmission can be realized.

Intrinsically, the same shifters as in both first stage shifting and second stage shifting can be applied, and the number of parts can be reduced, so that the transmission 1 can be downsized.

Further, since no long length conventional transmission shifters are necessary, said transmission of the present invention has a strength advantage.

Still further, it is not necessary to prepare the inversion lever mechanism for a conventional transmission, so that an increase in parts a nd structural complications can be avoided.

EXPLANATION OF NUMBERS

Figure 1:
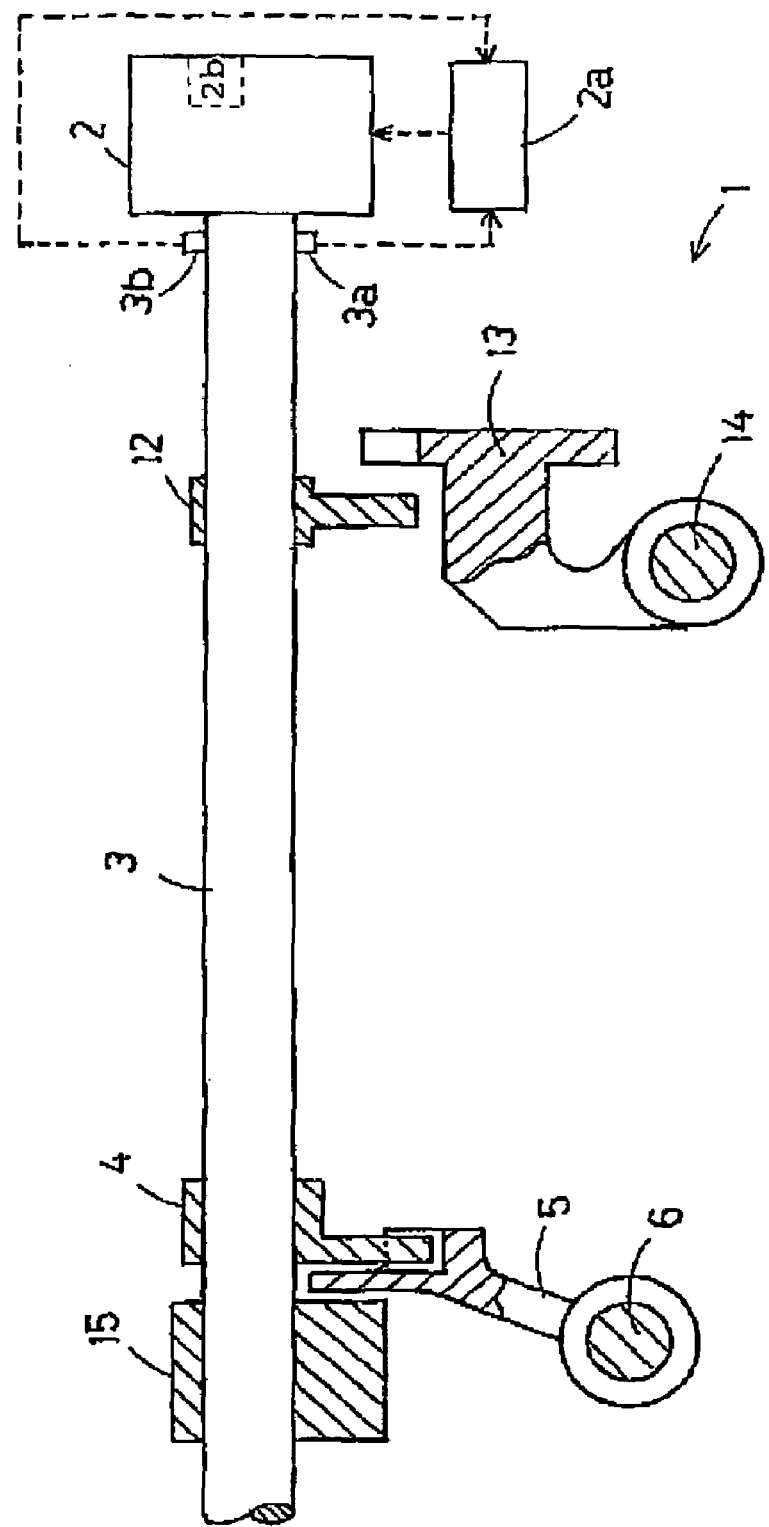
FIG. 1 is an explanatory side view of the transmission of EXAMPLE 1 (reverse stage selecting state).

1. Automatic shift type manual transmission
2. Actuator
3. Actuator rod
4. The second shifter (reverse shifter)
12. The first shifter (forward shifter)
16. Shifter

PREFERRED EMBODIMENTS

EXAMPLE 1

The present invention is illustrated citing an embodiment shown in FIGS. 1 to 6.

As shown in FIGS. 1 to 6, an automatic shift type manual transmission of an automobile is equipped with a slidable and rotatable actuator rod 3 to one side of which an actuator 2 is attached, a reverse shifter 4 which is the second shifter fixedly attached to said actuator rod 3, a slidable reverse rod 6 on which a reverse bracket 5 is fixedly carried, said reverse shifter 4 engaging with said reverse bracket 5, a reverse select 7 fixedly carried on said reverse rod 6, a reverse idler shaft 9 on which a reverse driven gear 8 is slidably carried, said reverse select 7 engaging with said reverse driven gear 8, and an input shaft 11 on which a reverse drive gear 10 is carried, said reverse driven gear 8 engaging with said reverse drive gear 10.

In this embodiment, different operating measurements (slide measurement and rotation measurement) are given to sad actuator rod 3 by an actuator control unit (hereafter ACU) 2a, as a drive control system. Said ACU 2a is composed of a microprocessor whose main part is a CPU, and besides said CPU, said ACU is equipped with a ROM to memorize the transaction program, a RAM to memorize data temporarily, input and output port, and a correspondence port.

To said ACU2a, the slide measurement signal of said actuator rod 3 from the stroke sensor 3a, the rotation angle signal of said actuator rod 3 from the rotation angle sensor 3b, and the like, are input through said input port, while from said ACU, drive control signal to said actuator 2 is output through said output port.

The neutral position of said reverse shifter 4 is set to be in a position pivoting toward one side from a vertical position to said actuator rod 3 (see FIG. 2), the reverse position of said reverse shifter 4 being set to be in a position pivoting toward the other side from a vertical position to said actuator rod 3 (see FIG. 3), with the rotation angle θ of said reverse shifter 4 from a vertical position to said actuator rod 3 toward the neutral side being set to be substantially the same as the rotation angle θ of said reverse shifter 4 from a vertical position to said actuator rod 3 toward the reverse side.

Figure 4:
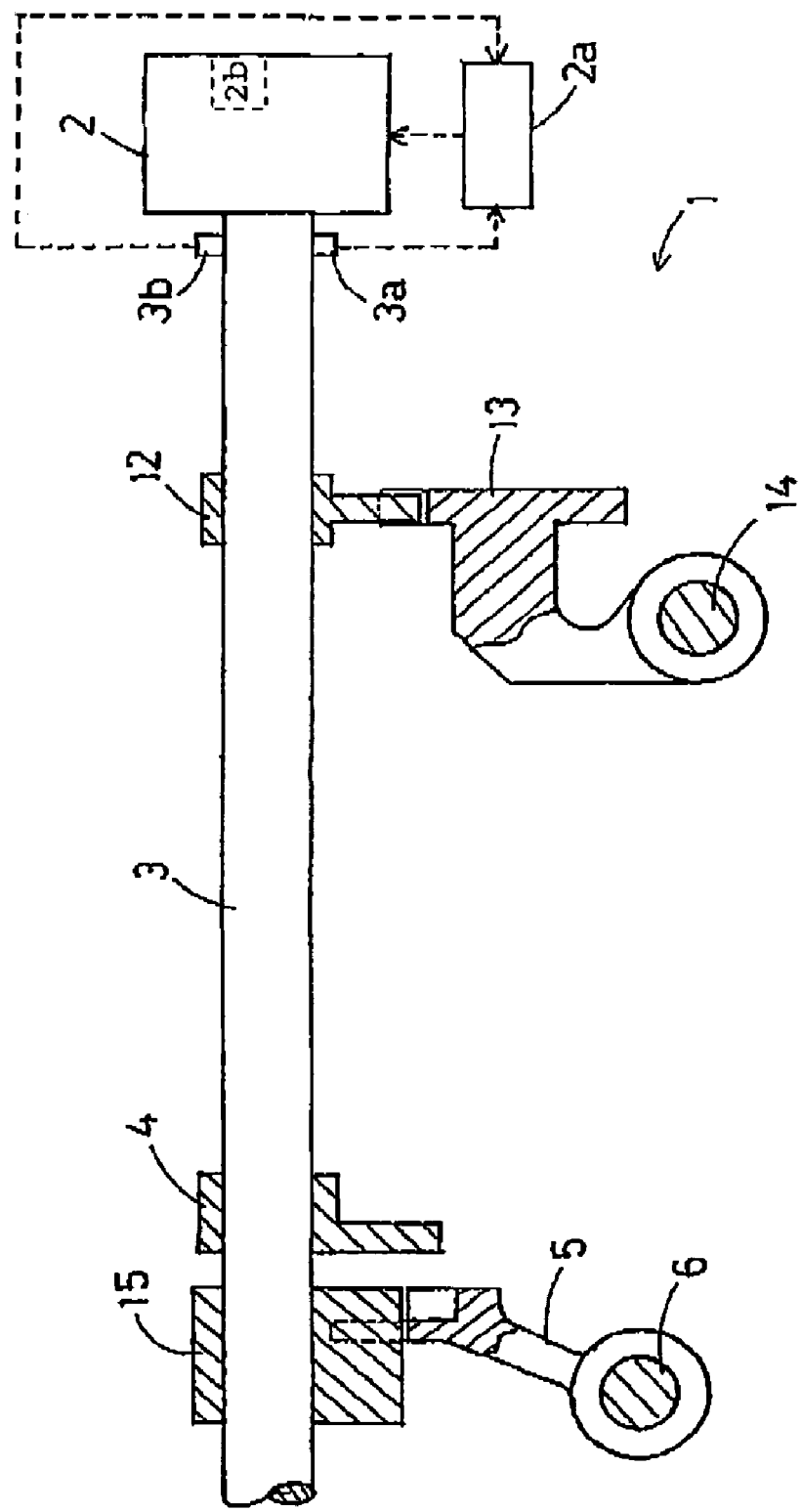
FIG. 4 is an explanatory side view of the transmission of EXAMPLE 1 (forward stage selecting state).
Figure 5:
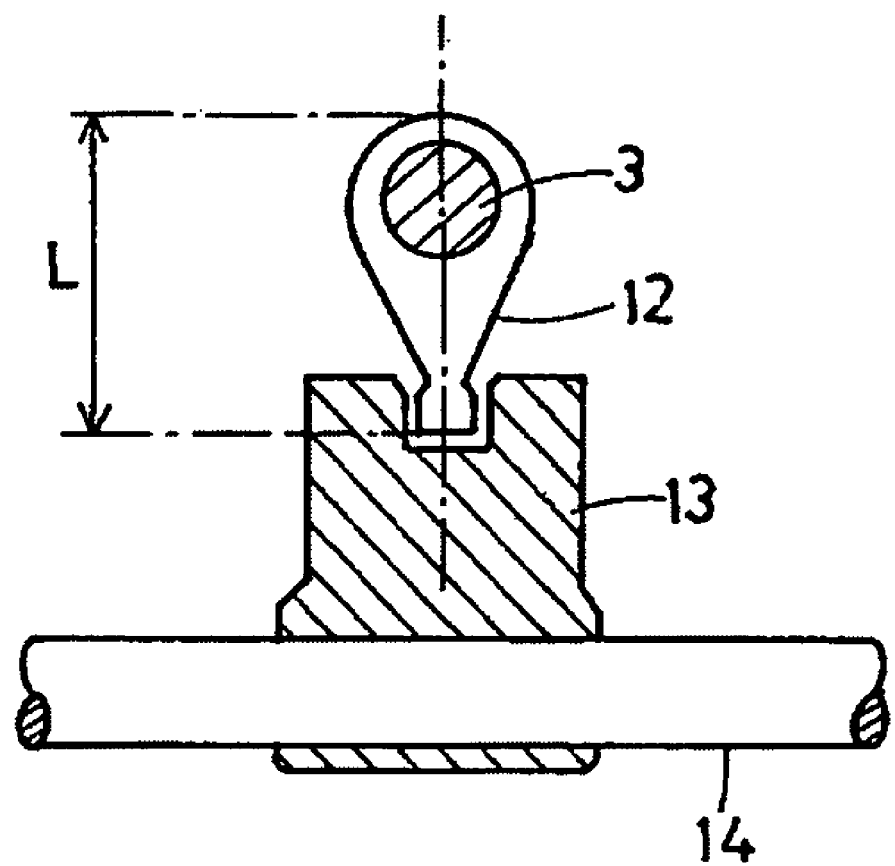
FIG. 5 is an explanatory front view of the transmission of EXAMPLE 1 (forward stage neutral state).
Figure 6:
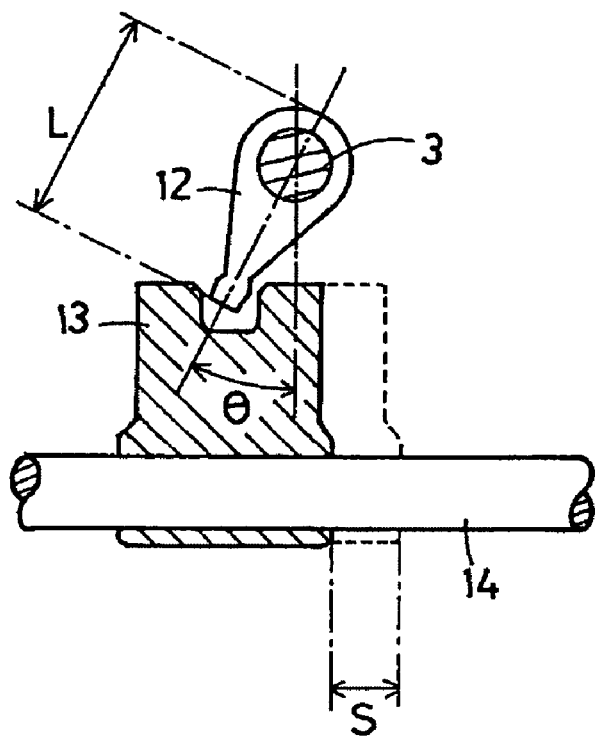
FIG. 6 is an explanatory front view of the transmission of EXAMPLE 1 (forward stage shifting state).
Figure 6:
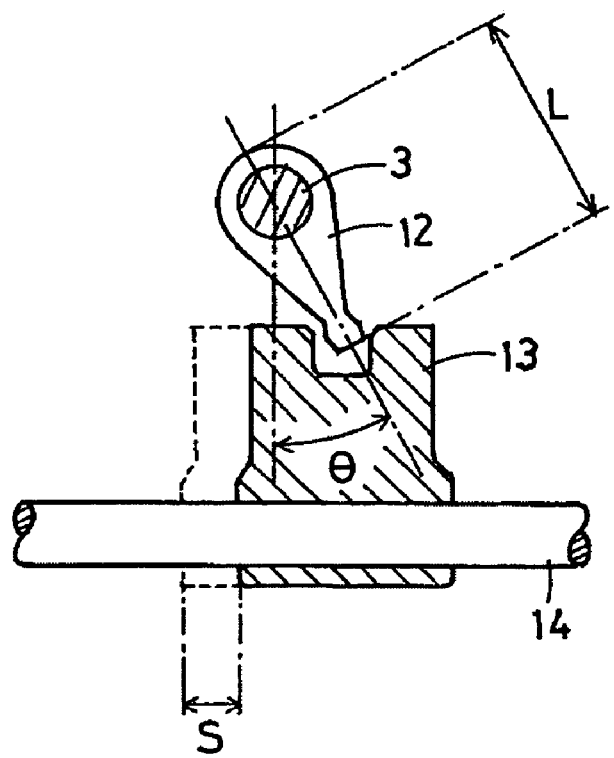

Further, as shown in FIGS. 4 to 6, a forward shifter 12 being the first shifter, is fixedly carried on said actuator rod 3, and a forward bracket 13 engaging with said forward shifter 12 is fixedly carried on said forward rod 14, said forward rod 14 being set to be slidable.

Still further, a reverse interlock drum 15 is carried on said actuator rod 3, said reverse interlock drum 15 engaging with said reverse bracket 5 in the state in which said forward shifter 12 engages with said forward bracket 13.

The neutral position of said forward shifter 12 is set to be in a vertical position to said actuator 3 (see FIG. 5), the even numbered speed ($2^{nd}$-speed, $4^{th}$-speed, $6^{th}$-speed) which is the first stage shifting position of said forward shifter 12 is set to be in a position pivoting toward one side at a rotation angle θ from a vertical position to said actuator rod 3 (see FIG.6(a)), with the odd numbered speed ($1^{st}$-speed, $3^{rd}$-speed, $5^{th}$-speed) of said forward shifter 12 which is the second stage shifting position of said forward shifter 12 being set to be in a position pivoting toward the other side at a rotation angle θ form a vertical position to said actuator rod 3 (see FIG.6(b)).

In this embodiment, the length L of said reverse shifter 4 is set to be substantially the same as the length L of said forward shifter 12, with the shift stroke measurement 2S of the reverse stage shifting being set to be comparatively greater than the shift stroke measurement S of the forward stage shifting (shift stroke measurement S of even number speed stage or shift stroke measurement S of odd number speed stage).

Herein said shift stroke measurement is defined as the stroke measurement wherein said reverse bracket 5 (or said reverse rod 6, or said reverse select 7 or said reverse driven gear 8) slides along said reverse shaft 9 when said actuator rod 3 (or said reverse shifter 4) is rotated by said actuator 2, or the stroke measurement wherein said forward bracket 13 (or said forward rod 14) slides when said actuator rod 3 (forward shifter 12) is rotated by said actuator 2.

[Reverse Stage Shifting]

In said transmission 1, when shifting operation to the reverse stage is carried out, as shown in FIG. 1, a shift lever 2b is first select-operated toward the reverse side to select-slide said actuator rod 3 to the reverse position, then engages said reverse shifter 4 carried on said actuator rod 3 with said reverse bracket 5 carried on said reverse rod 6.

Figure 2:
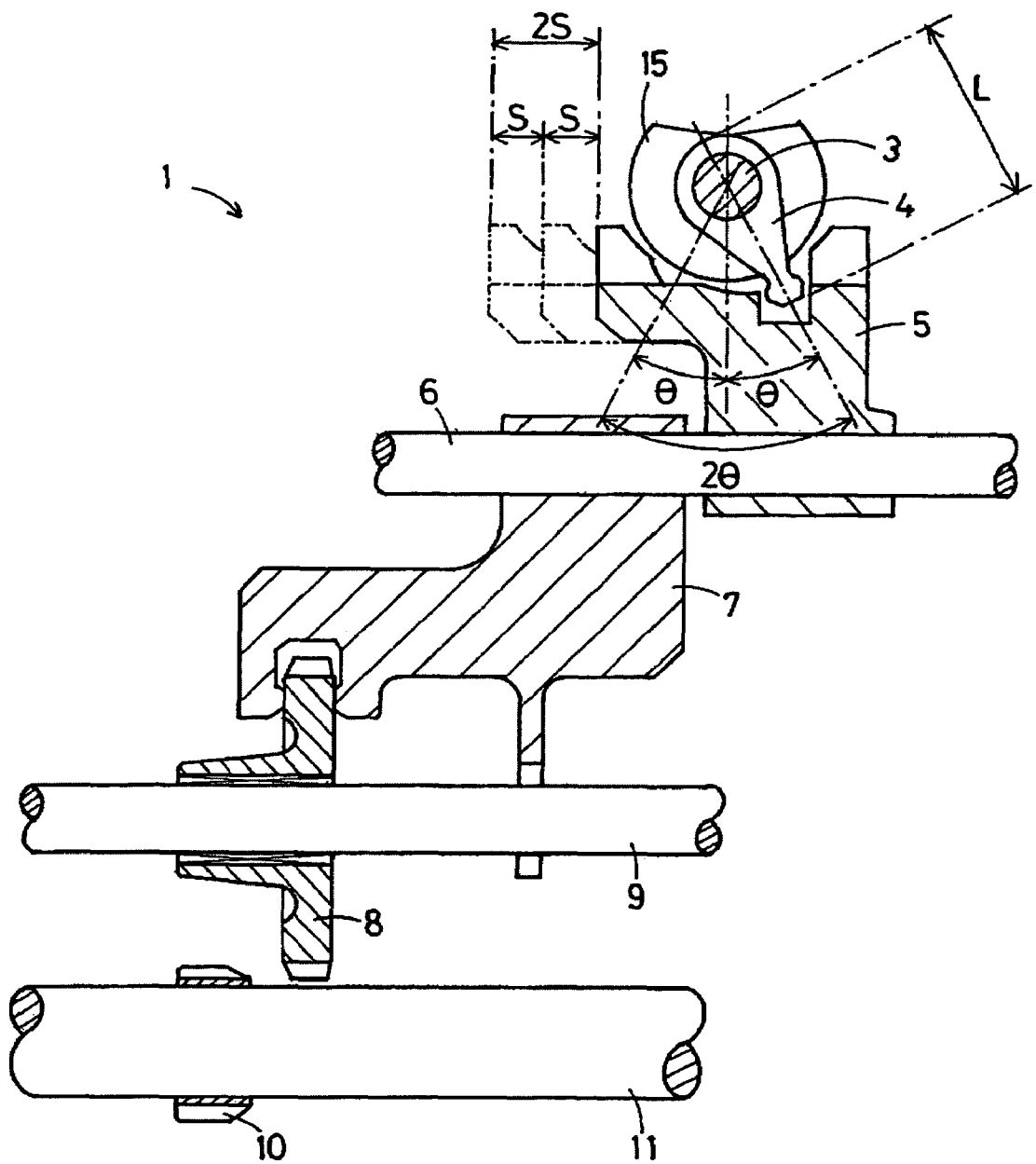
FIG. 2 is an explanatory front view of the transmission of EXAMPLE 1 (reverse stage neutral state).

In this case said reverse shifter 4 is put in its neutral position while said reverse driven gear 8 of said reverse idler shaft 9 is put in a state in which said reverse driven gear 8 does not engage with said reverse drive gear 10 of said input shaft 11 (see FIG. 2). Further, said forward shifter 12 is put in a state in which said forward shifter 12 does not engage with said forward bracket 13 (see FIG. 1).

Figure 3:
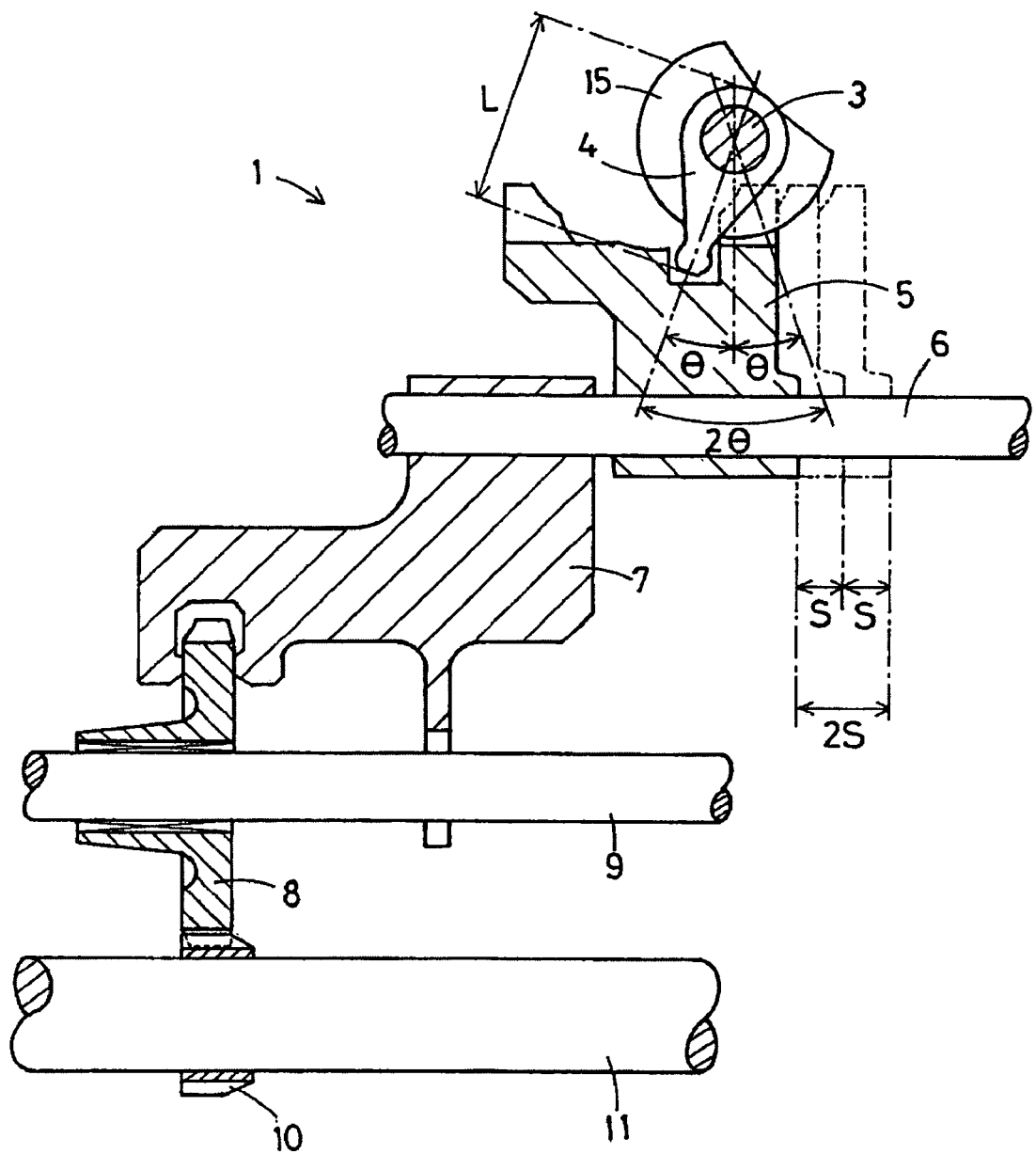
FIG. 3 is an explanatory front view of the transmission of EXAMPLE 1 (reverse stage shifting state).

Following that, as shown in FIG. 3, said shift lever is operated to start up said actuator 2, and rotate said actuator rod 3, after which said reverse shifter 4 is shift-rotated as much as the rotation angle 2θ from the neutral position to reverse position.

In this case, said reverse shifter 4 rotates to its reverse position, to slide said reverse rod 6 toward reverse side through said reverse bracket 5 engaging with said reverse shifter 4, so that said reverse select 7 carried on said reverse rod 6 slides toward reverse side as much as the shift stroke measurement 2S.

After that, said reverse select 7 slides toward the reverse side, as a result, said reverse driven gear 8 engaging with said reverse select 7 slides toward the reverse side, to engage said reverse driven gear 8 with said reverse drive gear 10, to attain rear stage shifting.

In this case, said forward shifter 12 carried on said actuator rod 3 does not engage with said forward bracket 13, so that said forward shifter 12 idles.

[Forward Stage Shifting]

In said transmission 1, in the case of shifting operation to the forward stage, as shown in FIG. 4, said actuator rod 3 is first select-slid to its forward position by select operating said shift lever to forward side, to engage said forward shifter 12 carried on said actuator rod 3 with said forward bracket 13 carried on said forward rod 14.

In this case, said forward shifter 12 is put at its neutral position and the forward drive gear (not shown in FIGS.) is put in a state in which said forward drive gear does not engage with the forward driven gear (not shown in FIG.), (see FIG. 5). Further, said reverse interlock drum 15 is put in a state in which said reverse interlock drum 15 engages with said reverse bracket 5 (see FIG. 4), said reverse shifter 4 being put in a state in which said reverse shifter 4 does not engage with said reverse bracket 5.

Following that, as shown in FIG. 6, said shift lever is operated to start up said actuator 2, and rotate said actuator rod 3, so as to shift rotate said forward shifter 12 from its neutral position at an angle θ to the odd number speed such as $1^{st}$-speed, $3^{rd}$-speed, $5^{th}$-speed and the like, as shown in FIG.6 (a) or even numbered speed such as $2^{nd}$-speed, $4^{th}$-speed, $6^{th}$-speed and the like, as shown in FIG. 6 (b).

As a result, by rotating of said forward shifter 12 to odd numbered speed position or even numbered speed position, said forward rod 14 slides from its neutral position to the odd numbered speed stage side or even numbered speed stage side as much as the shift stroke measurement S, to engage the forward drive gear with the forward driven gear, to attain forward stage shifting.

In this case, since said reverse shifter 4 carried on said actuator rod 3 does not engage with said reverse bracket 5, said reverse shifter idles, and in this case, since said reverse bracket 5 engages with said reverse interlock drum 15, unexpected sliding of said reverse rod 6 can be avoided.

In said automatic shift type manual transmission, even in the case where reverse shifting has a comparatively large shift stroke measurement, the shift stroke measurement can be increased without extending the length of said reverse shifter 4, by setting the neutral position of said reverse shifter 4 in a position pivoting toward one side from a vertical position to said actuator rod 3, and setting the reverse position of said reverse shifter 4 in a position pivoting toward the other side from a vertical position to said actuator rod 3, namely by making the rotation angles of said actuator rod 3 differ.

Further, since the rotation angle 2θ of said reverse shifter 4 from its neutral side to its reverse side can be set to be substantially the same as the rotation angle 2θ of said forward shifter 12 from its even numbered speed stage side to its odd numbered speed stage side, the shift stroke measurement can be increased without increasing the rotation angle of said actuator 2.

Accordingly, in the present invention, it s not necessary to increase the size of the transmission 1 corresponding to the length of said reverse shifter 4, or to increase the size of the actuator 2 corresponding to the rotation angle measurement as in conventional transmission, so that the downsizing of the transmission 1 and the actuator 2 can be realized. Further, since the length of the reverse shifter 4 can be shortened, the transmission of the present invention has advantages in its strength in comparison to a conventional transmission. Still further, it is not necessary to provide an exclusive lever part to shift to the reverse stage separately as in a conventional transmission, so that structural complications can be avoided.

EXAMPLE 2

FIGS. 7 to 12 show another embodiment.

In the automatic shift type manual transmission of this embodiment, the gear arrangement of the forward stage separates into two groups, $1^{st}$, $3^{rd}$, $4^{th}$ speed, and $2^{nd}$, $5^{th}$, $6^{th}$ speed, so that preshifting can be realized in said gear arrangement, but the other basic structures are the same as in the transmission in EXAMPLE 1 as shown in FIGS. 1 to 6.

Figure 7:
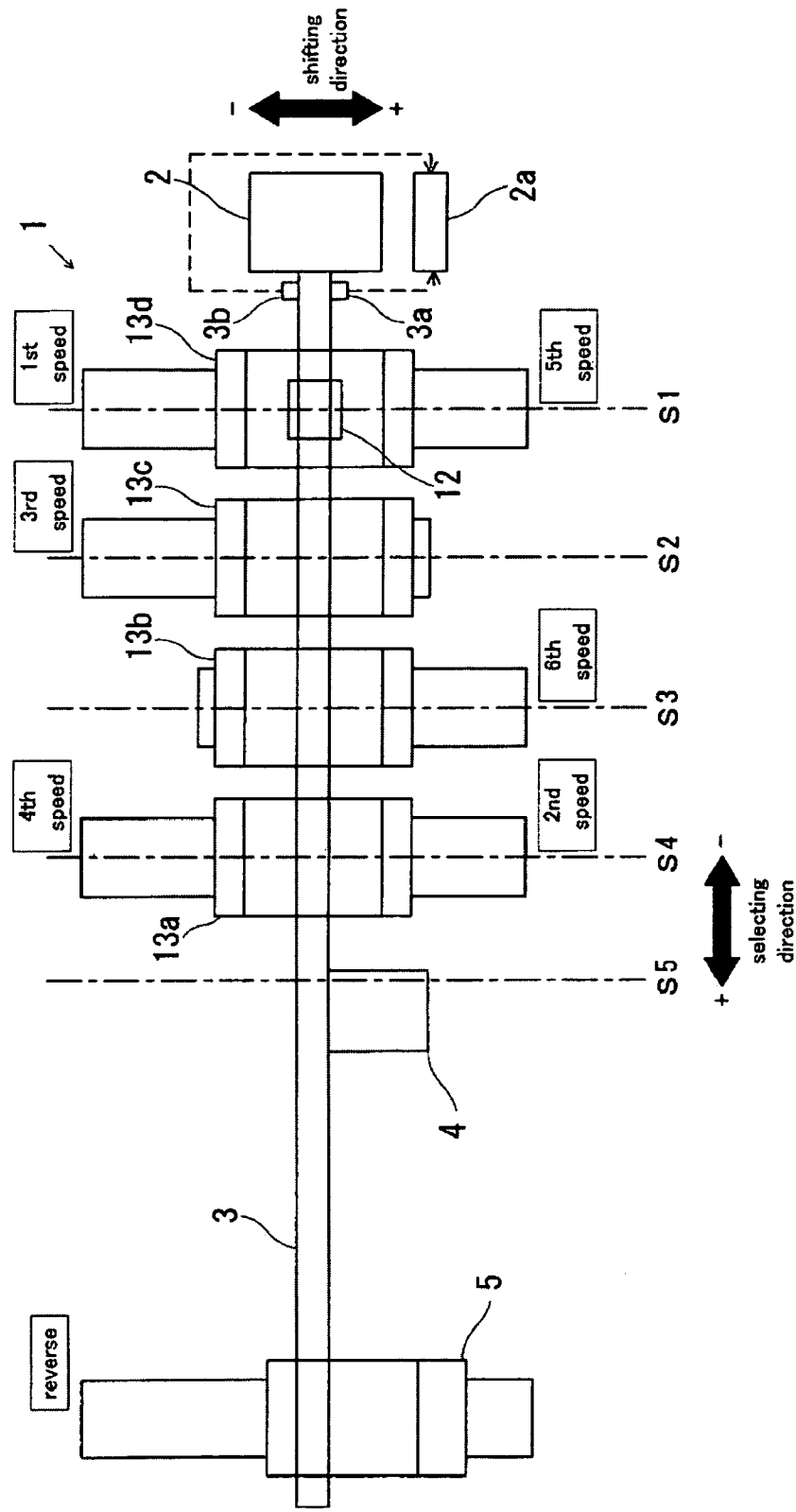
FIG. 7 is an explanatory plan view of the transmission of EXAMPLE 2.
Figure 8:
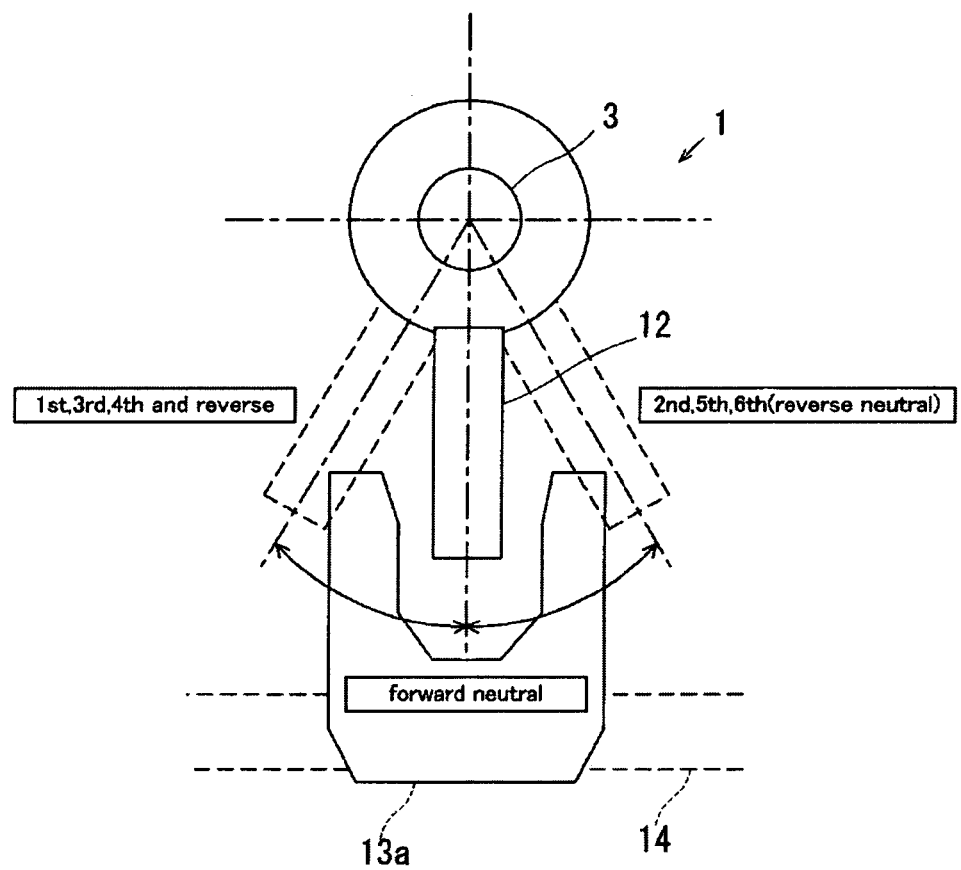
FIG. 8 is an explanatory front view of the transmission of EXAMPLE 2.

Namely as shown in FIGS. 7 and 8 in said automatic shift type manual transmission 1 of this embodiment, a forward bracket 13a for $2^{nd}$ speed and $4^{th}$ speed, a forward bracket 13b for $6^{th}$ speed, a forward bracket 13c for $3^{rd}$ speed, and a forward bracket 13d for $1^{st}$ speed and $5^{th}$ speed are equipped as forward brackets, to engage with a forward shifter 12 which is the first shifter.

Further, said automatic shift type manual transmission 1 has the first input shaft (not shown in FIGS.) to which the first clutch (not shown in figures) is connected, and the second input shaft (not shown in FIGS.) to which the second clutch (not shown in FIGS.) is connected, and a speed change gear for $1^{st}$, $3^{rd}$, $5^{th}$ speed is arranged on said first input shaft, and a speed change gear for $2^{nd}$, $4^{th}$, $6^{th}$ speed is arranged on sad second input shaft, and for instance, when the automobile drives at $1^{st}$ speed (or $3^{rd}$ speed or $5^{th}$ speed), the second clutch is released so that $2^{nd}$ speed (or $4^{th}$ speed or 6th speed) change gear can be preselected (preshift).

In this case, as shown in FIG. 8 when selecting operation to the rear stage is performed, the neutral position of said reverse shifter 4 is set to be in a position pivoting toward one side from a vertical position to said actuator rod 3, the reverse position of said reverse shifter 4 being set to be in a position pivoting toward the other side from a vertical position to said actuator rod 3, and further, the rotation angle $+\theta_0$ of said reverse shifter 12 from a vertical position to said actuator rod 3 to the neutral position is set to be substantially equal to the rotation angle $-\theta_0$ of said reverse shifter 12 from a vertical position to said actuator rod 3 to the reverse position in absolute value($\theta_0$).

Further, as shown in FIG. 8, when selecting operation to the forward stage is performed, the neutral position of said forward shifter 12 is set to be in a vertical position to said actuator rod 3, the speed change positions on one side of the first stage shifting position of said forward shifter 12, namely the $2^{nd}$, $5^{th}$, and $6^{th}$ speed change positions are set so as to pivot toward one side from a vertical position to said actuator rod 3 at a rotation angle, $+\theta_0$, the speed change position on the other side of the first stage shifting position of said forward shifter 12, namely $1^{st}$, $3^{rd}$, and $4^{th}$ speed change positions are set so as to pivot toward the other side from a vertical position to said actuator rod 3 at or rotation angle $-\theta_0$.

In said transmission 1, shifting to the rear stage or forward stage is attained by the operation of the shift lever (not shown in FIGS.) the same as in

EXAMPLE 1.

Hereinafter, the movement of said automatic shift type manual transmission 1 of this embodiment, particularly the movement of the speed changes is explained.

Figure 9:
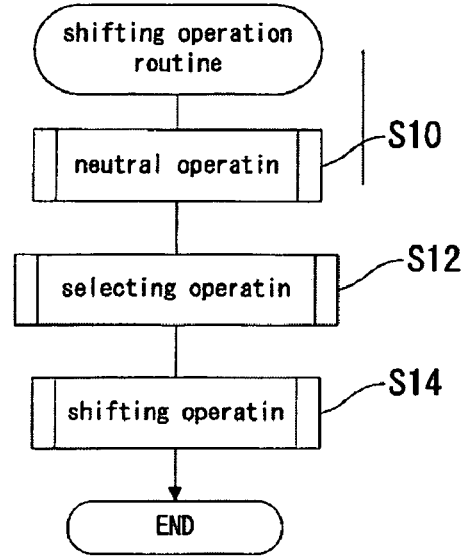
FIG. 9 is a flowchart of a shifting operation routine in EXAMPLE 2.

FIG. 9 shows a flowchart of an example of a shifting operation routine, as practiced by said actuator control unit (hereafter ACU) 2a.;

This routine is practiced when shifting instruction is effected upon said transmission 1.

Figure 10:
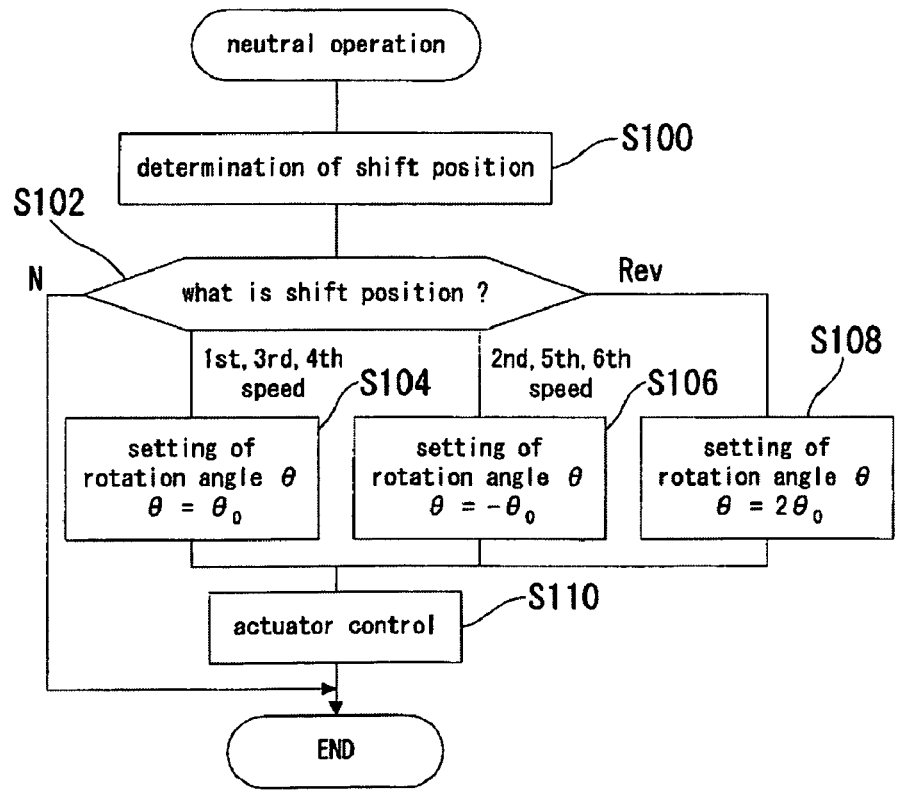
FIG. 10 is a flowchart of the neutral operation in EXAMPLE 2.
Figure 11:
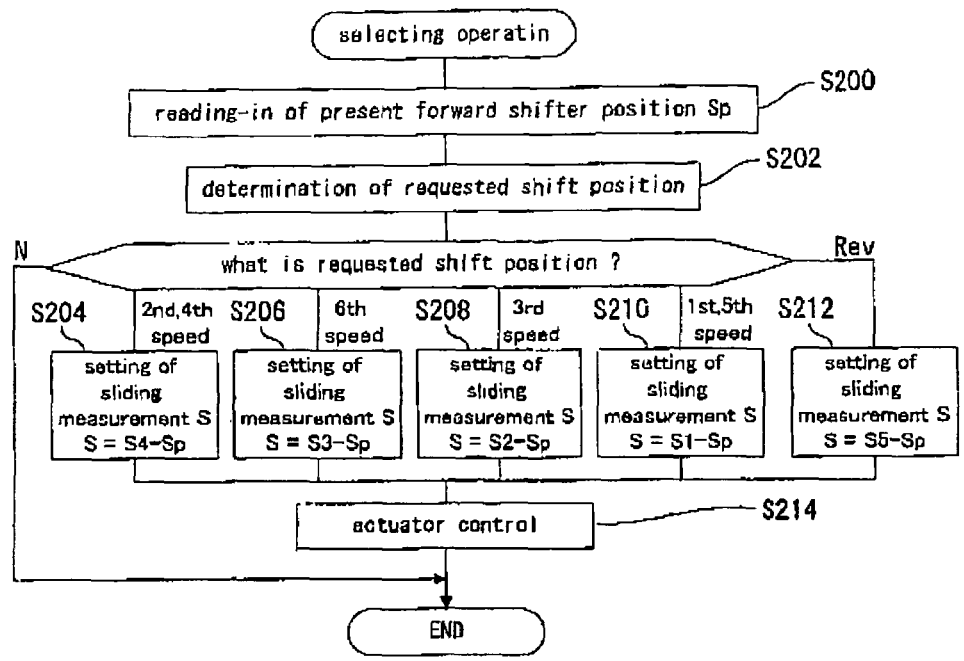
FIG. 11 is a flowchart of the selecting operation in EXAMPLE 2.
Figure 12:
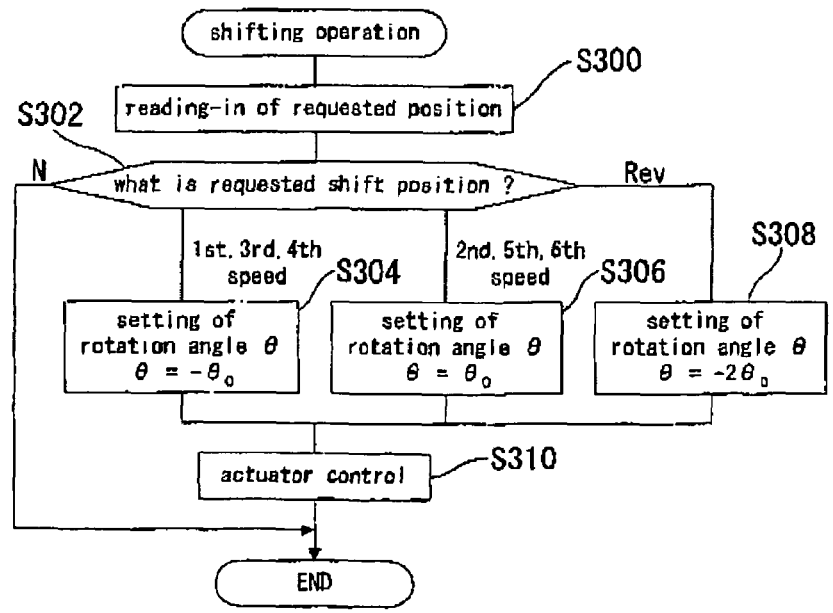
FIG. 12 is a flowchart of the shifting operation in EXAMPLE 2.

When said shifting operation routine is practiced, the CPU of ACU 2a first practices the neutral operation, as illustrated in FIG. 10 (Step S10), then the selecting operation, as illustrated in FIG. 11 (Step S12), then the shift operation, as illustrated in FIG. 12 (Step S14) in turn.

In the neutral operation, as shown in FIG. 10, the CPU of ACU2a practices determining the present shift position (Step S100). This determination is performed by a signal from the shift position sensor (not shown in figures) equipped in each shifting stage.

When the present shift position is determined to be any of the $1^{st}$, $3^{rd}$, or $4^{th}$ speed, the rotation angle $\theta$ of said actuator rod 3 is set to be $\theta_0$ so as to put said forward shifter 12 in the neutral position (Step S104), and at the same time said actuator 2 is controlled so as to rotate said actuator rod 3 at a set rotation angle $\theta$ (Step S110), completing the procedure.

Similarly, when the present shift position is determined to be any of the $2^{nd}$, $5^{th}$, or $6^{th}$ speed, the rotation angle $\theta$ of said actuator rod 3 is set to be $-\theta_0$(Step S106), and when the present shift position is determined to be reverse (Rev), the rotation angle $\theta$ of said actuator rod 3 is set to be $2\theta_0$(Step S106), said actuator rod 3 being controlled by said actuator 2 so as to rotate at each set rotation angle, completing the procedure.

In the selecting operation, as shown in FIG. 11, the CPU of ACU2a reads in the present position Sp of said forward shifter 12 (Step S200) to practice determining the requested shift position from the shifting instructions (Step S202).

The above mentioned reading in procedure of the present position Sp of said forward shifter 12 can be performed by reading in the signal from said stroke sensor 3a, being equipped in said actuator 2. Further, determination of the requested shift position can be performed by the signal based on the shift operation of the driver.

When the requested shift position is determined to be $2^{nd}$, $4_{th}$ speed, the sliding measurement S of said actuator rod 3 is set to be S4-Sp so as to slide said forward shifter 12 to the $2^{nd}$, $4^{th}$ speed position S4 (Step S204), said actuator 2 being controlled so as to slide said actuator rod 3 in the sliding measurement set described above (Step S214), completing the procedure.

Similarly, when the requested shift position is determined to be $6^{th}$ speed, the sliding measurement S of said actuator rod 3 is set to be S3-Sp (Step S206), when the requested shift position is determined to be $3^{rd}$ speed, the sliding measurement S of said actuator rod 3 is set to be S2-Sp (Step S208), when the requested shift position is determined to be $1^{st}$, $5^{th}$ speed, the sliding measurement S of said actuator rod 3 is set to be S1-Sp (Step S210), and when the requested shift position is determined to be reverse (Rev), the sliding measurement S of said actuator rod 3 is set to be S5-Sp (Step S212), said actuator 2 being controlled so as to slide said actuator rod 3 in each sliding measurement S set described above (Step S214), completing the procedure.

This selecting operation is performed in a state in which said forward shifter 12 is put at its n eutral position in the forward selecting operation, said reverse shifter 4 not engaging with said reverse bracket 5.

In this stage, the forward drive gear (not shown in Figures) is put in a state in which the forward drive gear does not engage with the forward driven gear (not shown in Figures).

Meanwhile, the selecting operation in the reverse stage is performed in a state in which said reverse shifter 4 is put at its neutral position, said forward shifter 12 not engaging with any of said forward brackets 13a, 13b, 13c and 13d. In this stage, the reverse driven gear of the reverse idler shaft (not shown in Figures) is put in a state in which the reverse driven gear does not engage with the reverse drive gear of the input shaft yet (not shown in Figures).

In this embodiment, the sliding measurement of said actuator rod 3 is controlled by the position of said forward shifter 12 as its criterion, that is because when said forward shifter 12 is put at the position S5, said reverse shifter 4 is set to be at a position in which said reverse shifter 4 engages with said reverse fork bracket 5, resulting in the shifting control to reverse being performed by controlling only the sliding measurement of said forward shifter 12, but on the contrary, of course, the sliding measurement of said actuator rod 3 may be controlled by the position of said reverse shifter 4 as its criterion in this embodiment.

In the shifting operation, as shown in FIG. 12, the CPU of ACU2a reads in the requested shift position (Step S300), and at the same time practices the determination of the requested shift position (Step S302).

When the requested positions are determined to be $1^{st}$, $3^{rd}$, $4^{th}$ speed, the rotation angle θ of said actuator rod 3 is set to be $-θ_0$ so as to attain the requested shift position (Step S304), said actuator 2 being controlled so as to rotate said actuator rod 3 at a rotation angle θ set as described above (Step S310), completing the procedure.

Similarly, when the requested shift positions are determined to be $2^{nd}$, $5^{th}$, $6^{th}$ speed, the rotation angle θ of said actuator rod 3 is set to be $θ_0$ so as to attain the requested shift position (Step S306), when the requested shift position is determined to be reverse (Rev), the rotation angle θ of said actuator rod 3 is set to be −2θ so as to attain the reverse stage (Step S308), said actuator 2 being controlled so as to rotate said actuator rod 3 at each rotation angle set as described above (Step S310), completing the procedure.

In a case where the shifting operation is performed to the forward stage, since said reverse shifter 4, carried on said actuator rod 3, does not engage with said reverse bracket 5, said reverse shifter 4 idles.

Meanwhile in a case where the shifting operation is performed to the reverse stage, since said forward shifter 12, carried on said actuator rod 3, does not engage with any of said forward brackets 13a, 13b, 13c, and 13d, said forward shifter 12 idles.

Said automatic shift type manual transmission 1 of this EXAMPLE has a similar action and effect as the transmission of EXAMPLE 1.

Further, in said automatic shift type manual transmission, since the twin clutch system has been adopted, and the gear arrangement is set so that preshifting is possible, shifting in the forward stage can be practiced by changing the connection of the first clutch and the second clutch, so that swift and low shock shifting can be achieved.

EXAMPLE 3

FIGS. 13 to 19 shows still another embodiment.

The automatic shift type manual transmission 1 of this embodiment has the same basic structure as said transmission of EXAMPLE 2 with the exception of the number of shifters 16.

Figure 13:
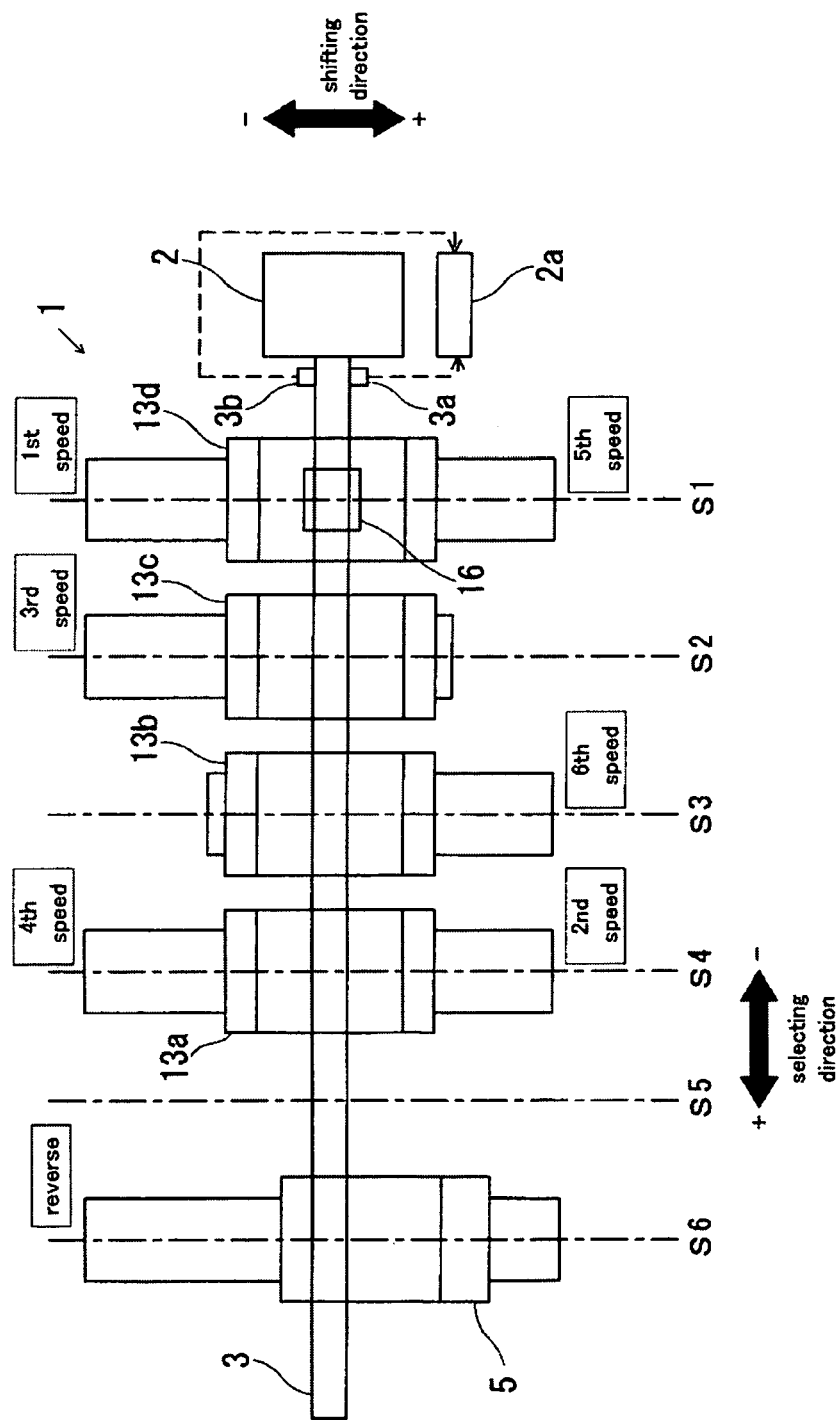
FIG. 13 is an explanatory plan view of the transmission of EXAMPLE 3.
Figure 14:
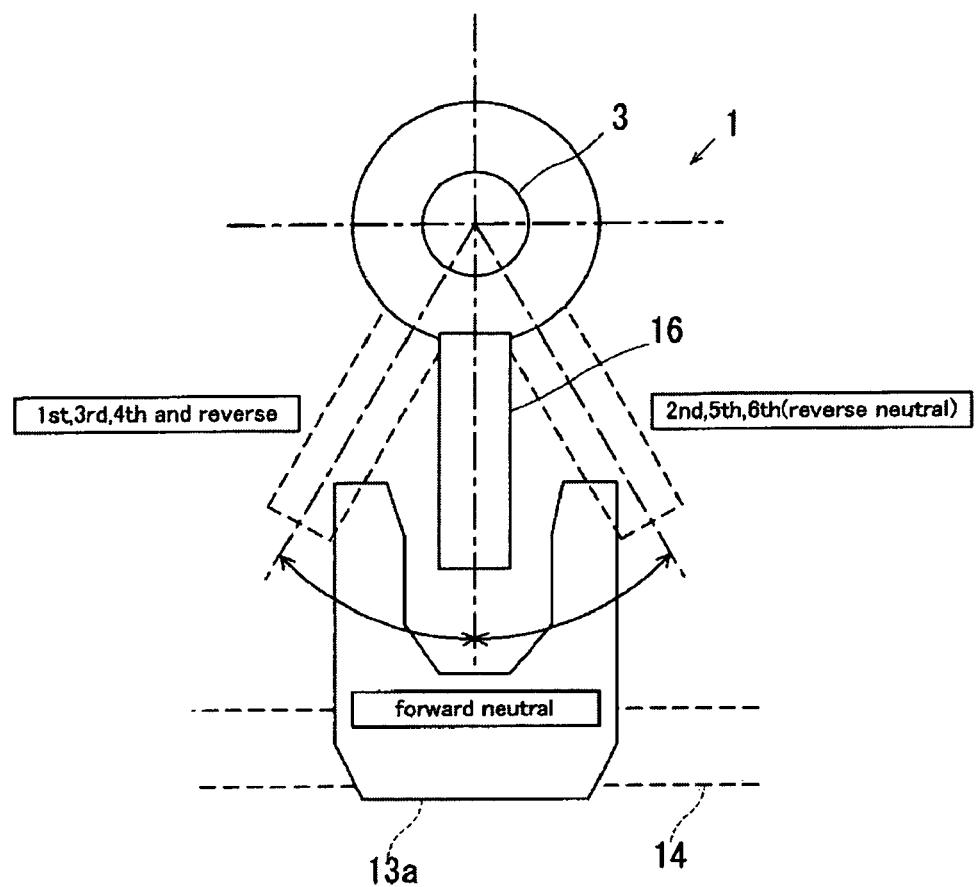
FIG. 14 is an explanatory front view of the transmission of EXAMPLE 3.

Namely, in said automatic shift type manual transmission 1 of EXAMPLE 2, two shifters, the reverse shifter 4 and the forward shifter 12, are carried on said actuator rod 3 as shown in FIGS. 7 to 12, while said automatic shift type manual transmission 1 of this EXAMPLE as shown in FIGS. 13 and 14, is equipped with a shifter 16 to perform the forward stage shift ($1^{st}$ speed to $6^{th}$ speed) which is the first shift stage or the reverse stage shift which is the second stage shift, an actuator rod 3 on which said shifter 16 is fixedly carried, and an actuator 2 to rotate said actuator rod 3 according to the shifting operation of the shift lever (not shown in Figures) and slide said actuator rod 3 according to the selecting operation of the shift lever (not shown in Figures).

Further, in said automatic shift type manual transmission 1 of this EXAMPLE, a forward bracket 13a for $2^{nd}$ speed and $4^{th}$ speed, a forward bracket 13b for $6^{th}$ speed, a forward bracket 13c for $3^{rd}$ speed, and a forward bracket 13d for $1^{st}$ speed and $5^{th}$ speed are equipped the same as in the transmission of EXAMPLE 2.

In this transmission 1, as shown in FIG. 14, when the selecting operation to the reverse stage is performed, the neutral position of said shifter 16 is set to be in a position pivoting toward one side from a vertical position to said actuator rod 3, and the reverse position of said shifter 16 is set to be in a position pivoting toward the other side from a vertical position to said actuator rod 3, and further, the rotation angle $+θ_0$ of said shifter 16 from a vertical position to said actuator rod 3 to the neutral position, and the rotation angle $•θ_0$ of said shifter 16 from a vertical position to said actuator rod 3 to the reverse position are set to be substantially the same angle in absolute value.

Further, as shown in FIG. 14, when the selecting operation to the forward stage is performed, the neutral position of said shifter 16 is set to be in a vertical position to said actuator rod 3, the one side shifting position in the first stage shifting of said shifter 16, namely the $2^{nd}$, $5^{th}$, $6^{th}$ speed shifting position is set to be a position pivoting toward one side from a vertical position to said actuator rod 3 at a rotation angle $+θ_0$, and the other side shifting position in the first stage shifting of said shifter 16, namely the $1^{st}$, $3^{rd}$, $4^{th}$ speed shifting position is set to be in a position pivoting toward the other side from a vertical position to said actuator rod 3 at a rotation angle $−θ_0$

[Shifting to the Reverse Stage Side]

In said transmission 1, in a case, where shifting operation to the reverse stage side is performed, the selecting operation of the shift lever (not shown in Figures) to the reverse stage side is first performed to slide said actuator rod 3 to the reverse position and engage said shifter 16 carried on said actuator rod 3 with said reverse bracket 5.

When said shifting operation to the reverse stage side is performed, said shifter 16 being put at the neutral position in the forward stage side (vertical to said actuator rod 3) releases from said forward bracket 13a and rotates to the neutral position in the reverse stage side (a position pivoting toward one side from a vertical position to said actuator rod 3 at a rotation angle Oo) to engage with said reverse bracket 5.

Following this, the same as in the transmission of EXAMPLE 1, the shifting operation of the shift lever is performed to start up said actuator 2 and said actuator rod 3 is rotated by actuator 2 so that said shifter 16 is shift-rotated from the neutral position to the reverse position at a rotation angle $2\theta_0$, to attain shifting to the reverse stage side.

[Shifting to the Forward Stage Side]

In said transmission 1, in a case where the shift operation to the forward stage side (such as $1^{st}$ and $2^{nd}$ speed). is performed, the shift lever is first select-operated to the forward stage side to select —slide said actuator rod 3 to the forward position, so as to engage said shifter 16 carried on said actuator rod 3 with said forward bracket 13*a*.

When said shift operation to the forward stage is performed, said shifter 16 being put at its the neutral position in the reverse stage side (a position pivoting toward one side from a vertical position to said actuator rod 3 at a rotation angle $+\theta_0$) releases from said reverse bracket 5 and rotates to its neutral position in the forward stage side (a vertical position to said actuator rod 3) to engage said forward bracket 13*a*.

Following this, the same as in the transmission of EXAMPLE 1, the shifting operation of the shift lever is performed to start up said actuator 2 and said actuator rod 3 is rotated by said actuator 2 so that said shifter 16 is shift-rotated from the neutral position to the $1^{st}$-speed position (odd number speed position) or the $2^{nd}$ speed position (even number speed position) at a rotation angle $\theta_0$ to attain the shifting to the forward stage side.

Herein the movement of said automatic shift type manual transmission 1, particularly the movement of the speed change is explained.

Figure 15:
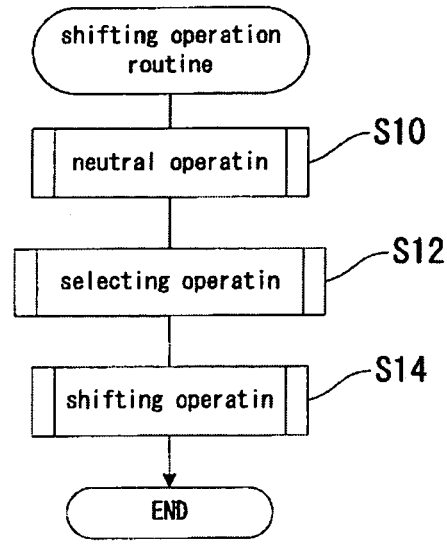
FIG. 15 is a flowchart of the shifting operation routine in EXAMPLE 3.
Figure 19:
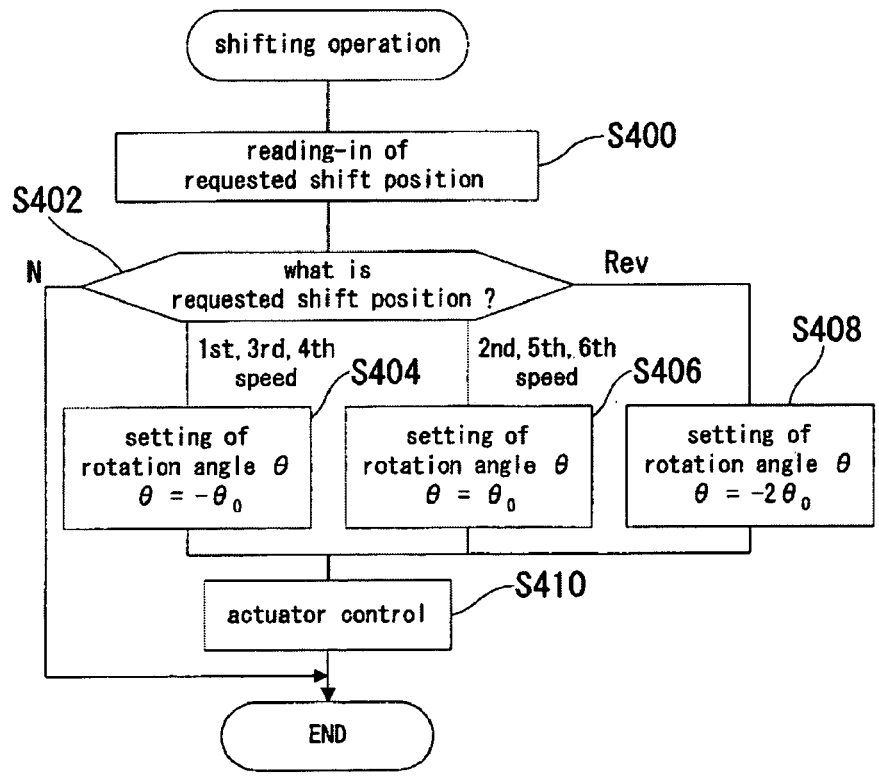
FIG. 19 is a flowchart of the shifting operation in EXAMPLE 3.

FIG. 15 shows a flow chart of an example of the shifting operation routine practiced by an actuator control unit (hereafter ACU)2*a*. This routine is practiced when shifting instructions are effected on said transmission 1. When said operation routine is practiced, the CPU of ACU2*a* practices first the neutral operation as illustrated FIG. 16 (Step S10), and then the selecting operation as illustrated in FIG. 17 (Step S12), and the shifting operation as illustrated in FIG. 19 (Step S14), in turn.

Figure 16:
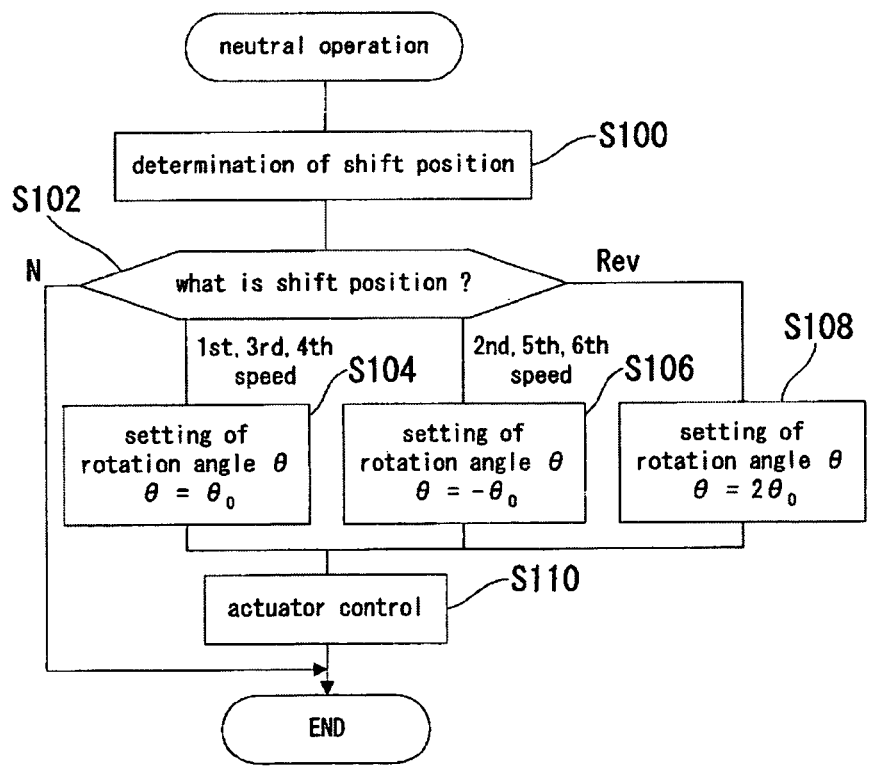
FIG. 16 is a flowchart of the neutral operation in EXAMPLE 3.
Figure 17:
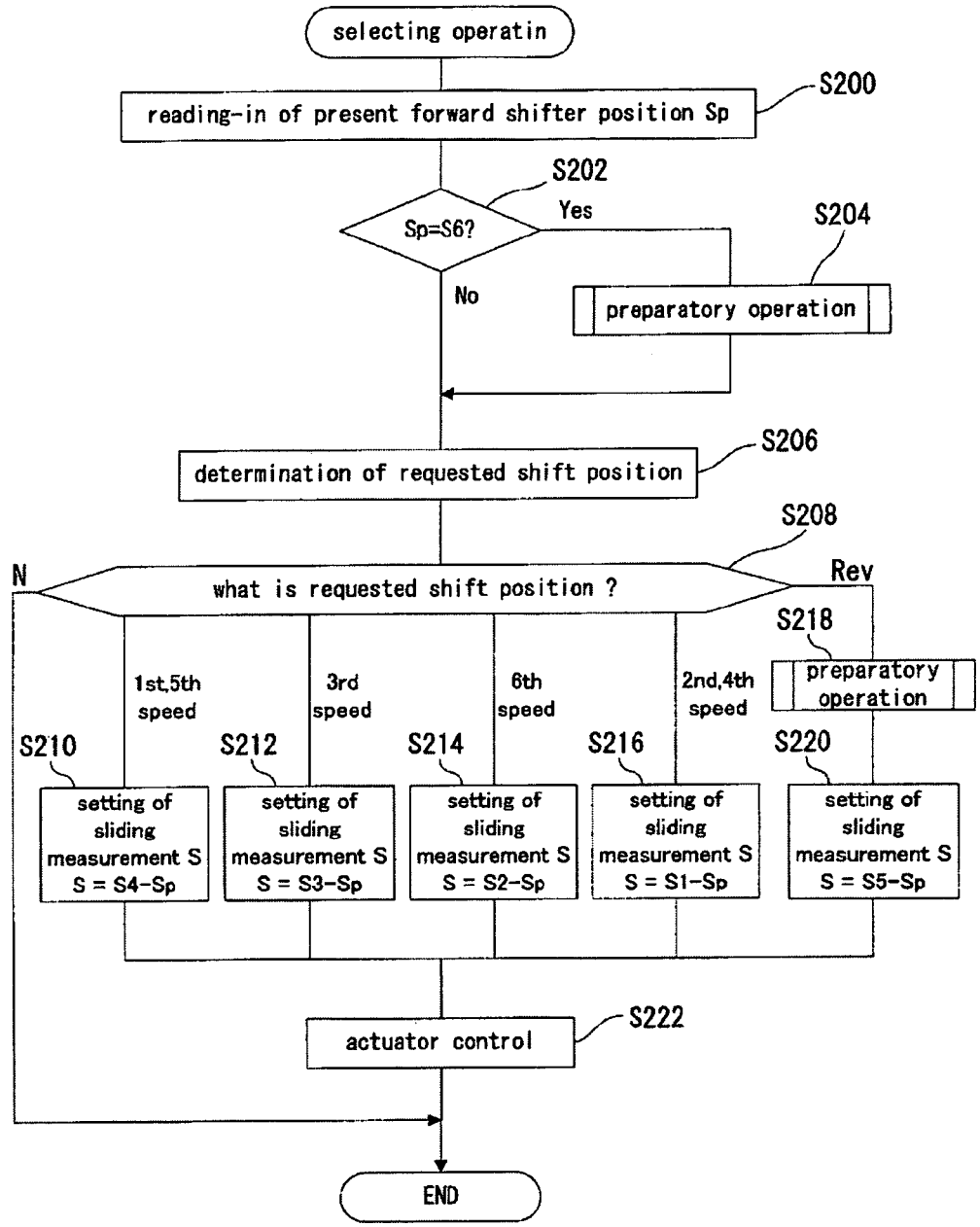
FIG. 17 is a flowchart of the selecting operation in EXAMPLE 3.

In said neutral operation, as shown in FIG. 16, the CPU of ACU2*a* practices determining the present shift position (step S100). This determination is performed by the signal from the shift position sensor (not shown in Figures), equipped in each shifting stage.

When the present shift position is determined to be any of $1^{st}$, $3^{rd}$ or $4^{th}$ speed, the rotation angle $\theta$ of said actuator rod 3 is set to be $\theta_0$ (Step S104), so as to put said shifter 16 at its neutral position in the forward stage, said actuator 2 being controlled so that the rotation angle $\theta$ of said actuator rod 3 is set as described above (Step S11O), completing the procedure.

Similarly, when the present shift position is determined to be any of $2^{nd}$, $4_{th}$, or $5_{th}$ speed, the rotation angle $\theta$ of said actuator rod 3 is set to be $-\theta_0$ (Step S106), and when the present shift position is determined to be reverse (Rev), the rotation angle $0$ of said actuator rod 3 is set to be $2\theta_0$ (Step S108), said actuator 2 being controlled so that each rotation angle $\theta$ of said actuator rod 3 is set as described (Step Silo), completing the procedure.

In the selecting operation, as shown in FIG. 17, CPU of the ACU2*a* reads in the present position Sp of said shifter 16 (Step S200), and at the same time, the CPU determines whether the position Sp of said shifter 16 is in its reverse position S6 or not (Step S202).

This procedure of reading in the present position of the shifter can be performed by reading in the signal from said stroke sensor 3*a* equipped in said actuator 2.

When the position of said shifter 16 (Sp) is not determined to be in its reverse position S6, the determination of the instructed and requested shift position is performed (Step S206). The determination of said requested shift position can be performed, for instance, by the signal based on the shift operation of the driver.

When said requested shift position is determined to be the $1^{st}$, $5^{th}$ speed position, the slide measurement S of said actuator rod 3 is set to be S4-Sp so as to slide said shifter 16 to the $1^{st}$, $5^{th}$ speed position S4 (Step S210), said actuator 2 being controlled so as to slide said actuator rod 3 in a set slide measurement S, completing the procedure.

Similarly when said requested shift position is determined to be the 3rd speed position, the slide measurement S of said actuator rod 3 is set to be S3-Sp (Step 212), and when said requested shift position is determined to be the $_6$th speed position, the slide measurement S of said actuator rod 3 is set to be S2-Sp (Step 214), and when said requested shift position is determined to be the $2^{nd}$, $4^{th}$ speed position, the slide measurement S is set to be Sl-Sp (Step S216), said actuator 2 being controlled so as to slide said actuator rod 3 in each slide measurement set as described above (Step S222), completing the procedure.

When said requested shift position is determined to be reverse (Rev), the preparatory procedure to shift toward the reverse stage side is performed (Step S218).

Figure 18:
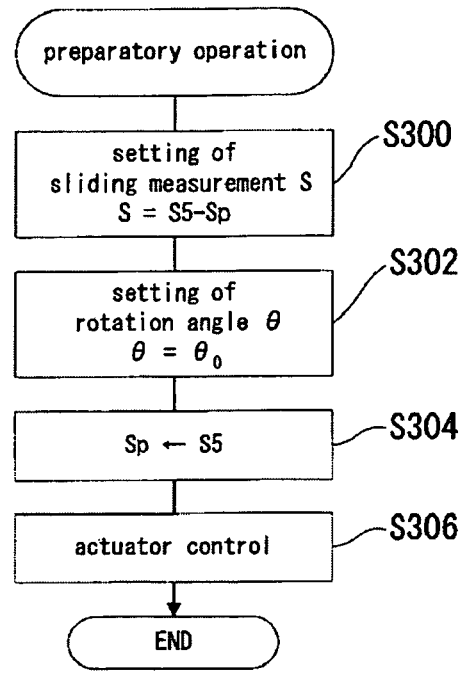
FIG. 18 is a flowchart of the preparatory operation in EXAMPLE 3 .

In said preparatory procedure, as shown in FIG.18, the slide measurement S is set to be S5-Sp so that the position of shifter 16 is to be in position S5, to release said shifter 16 from all forward brackets 13*a* to 13*d* (Step S300), while at the same time, the rotation angle $\theta$ of said shifter 16 is set to be $\theta_0$ so as to put said shifter 16 at its neutral position in the reverse shifting stage (Step S302), and thus the procedure to replace the present position of the shifter Sp to S5 is practiced (Step S304).

Herein as the position S5 of said shifter 16, a position is set to be between said forward bracket 13*a* and said reverse bracket 5, wherein said shifter 16 does not interfere with said forward bracket 13*a* and said reverse bracket 5 when said shifter 16 rotates.

Then said actuator 2 is controlled so as to slide and rotate said actuator rod 3 in a slide measurement and at a rotation angle $0$ being set as described above (Step S306), completing the procedure.

When said preparatory procedure is completed, the slide measurement S of said actuator rod 3 is set to be S6-Sp so as to slide said shifter 16 to the reverse position S6 (Step S220), said actuator 2 being controlled so as to slide said actuator rod 3 in a slide measurement S set as described above (Step S222), completing procedure.

Further, when the present position of said shifter is determined to be S6 in Step S202, to prepare for shifting to the requested shifting stage (in this case, with the exception of the reserve shifting stage), the preparatory procedure to put said shifter at its neutral position, namely a vertical position to said actuator rod 3, is practiced (Step S204).

Said preparatory procedure is completed in the same way as described above, and as shown in FIG. 18, when the slide measurement S of said actuator rod 3 is set to be S5-Sp and the rotation angle $\theta$ is set to be $\theta_0$, and the present position Sp of said shifter 16 is replaced to S5, said actuator 2 being controlled so as to operate said actuator rod 3 in a slide measurement and at a rotation angle, being set as described above (Step S300 to S306).

When said preparatory procedure is completed, a similar procedure to that described above is practiced, wherein the determination of the requested shift position is preformed to set the slide measurement of said actuator rod 3 according to the requested shift position, said actuator 2 being controlled so as to slide said actuator rod 3 in a slide measurement set as described above (Step S206 to S214, Step S222).

In said shift procedure, as shown in FIG. 19, the CPU of ACU2a performs the process wherein the CPU reads in the requested shift position (Step S500), and determines the requested shift position (Step S502).

When the requested shift position is determined to be $1^{st}$, $3^{rd}$, $4^{th}$ speed, the rotation angle θ of said actuator rod 3 is set to be $-θ_0$ so as to put said shifter 16 at the requested position (Step S504), said actuator 2 being controlled so as to rotate said actuator rod 3 at a rotation angle θ set as described above (Step S510), completing the procedure.

Similarly, when the requested shift position is determined to be $2^{nd}$, $5^{th}$, $6^{th}$ speed position, the rotation angle θ of said actuator rod 3 is set to be $θ_0$ so as to put said shifter at the requested shift position(Step S506), and when the requested shift position is determined to be the reverse position (Rev), the rotation angle θ of said actuator rod 3 is set to be $-2θ_0$ so as to shift said shifter to the reverse side (Step S508), said actuator 2 being controlled so as to rotate said actuator rod 3 at each rotation angle θ set as described above (Step S510), completing the procedure.

In said automatic shift type manual actuator 1 of this EXAMPLE, the same effects as EXAMPLES 1 and 2 can be realized. Further, in this EXAMPLE, forward stage shifting ($1^{st}$ speed to $6^{th}$ speed), and the reverse stage shifting can be performed by only one shifter 16, so that the number of parts can be reduced, and a transmission having a compact structure can be provided.

EXAMPLE 4

FIGS. 20 to 26 show still further embodiment.

In the automatic shift type manual transmission 1 of this EXAMPLE, said actuator rod 3 slides in shifting operation and rotates in selecting operation, differing from said transmission 1 of EXAMPLE 3 shown in FIGS. 13 to 19, while the other basic structures of said transmission of this EXAMPLE are the same as in the transmission of EXAMPLE 3.

Figure 20:
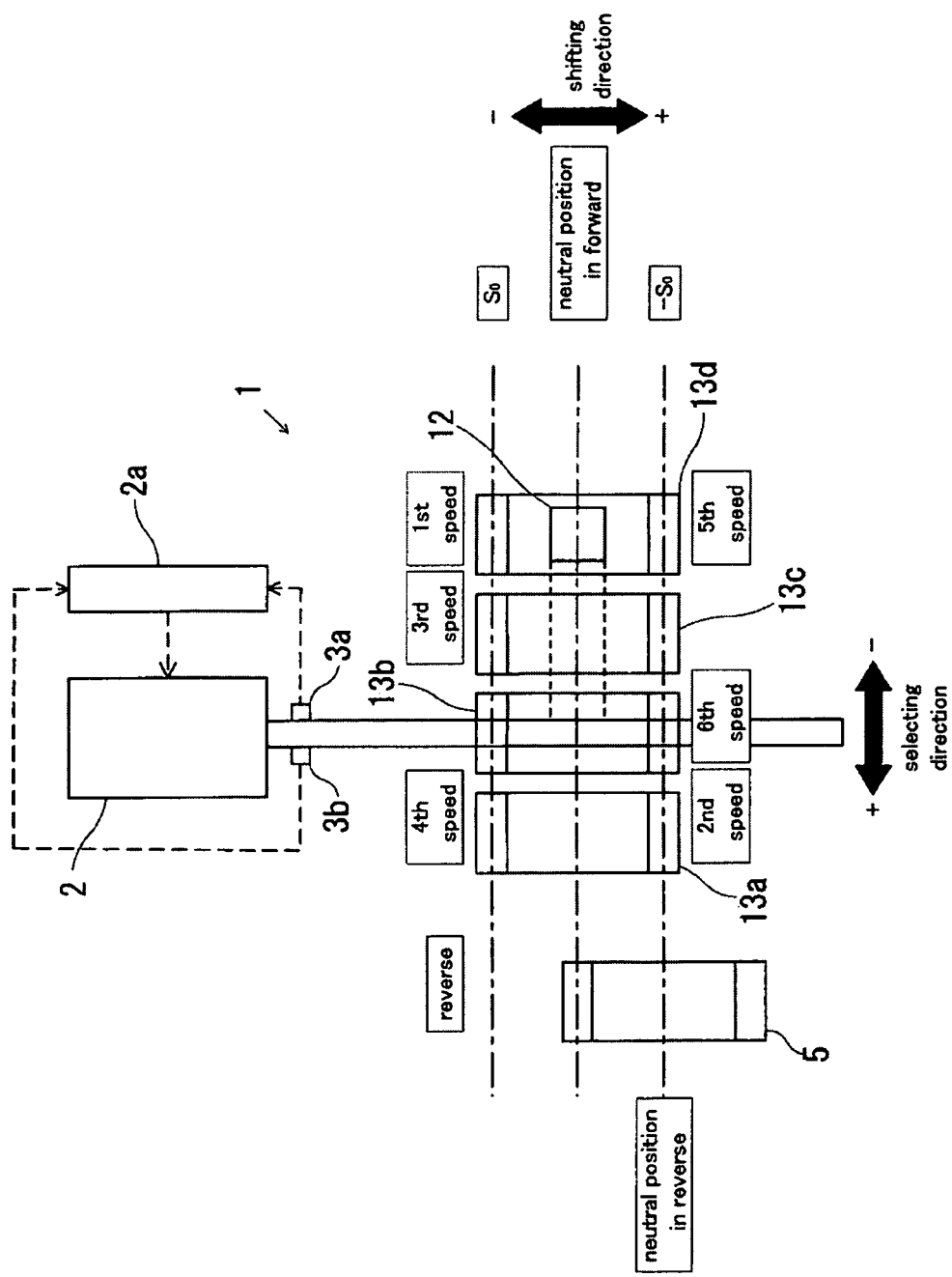
FIG. 20 is an explanatory plan view of the transmission of EXAMPLE 4.
Figure 21:
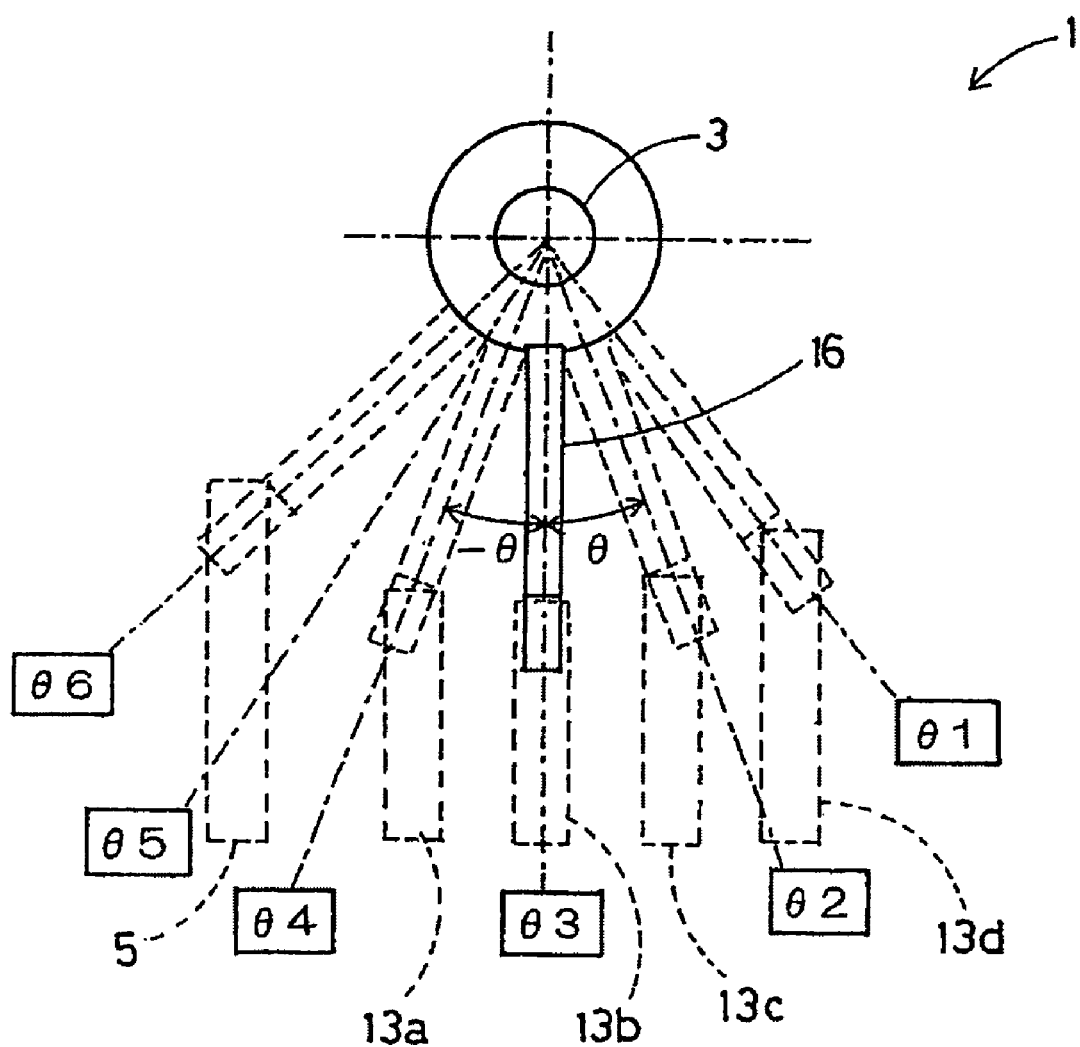
FIG. 21 is an explanatory front view of the transmission of EXAMPLE 4.

Namely, in said automatic shift type manual transmission 1 of EXAMPLE 3, as shown in FIGS. 13 to 19, said actuator rod 3 is rotated by said actuator 2 based on the shifting operation of the shift lever (not shown in Figures), while in said automatic shift type manual transmission 1 of this EXAMPLE, as shown in FIGS. 20 and 21, said actuator rod 3 is slid by said actuator 2 based on the shifting operation of the shift lever (not shown in Figures), and rotated by said actuator 2 based on the selecting operation of the shift lever, and similar to the transmission of EXAMPLE 3, said automatic shift type manual transmission 1 of this EXAMPLE is equipped with a forward bracket 13a for $2^{nd}$ speed and $4^{th}$ speed, a forward bracket 13b for $6^{th}$ speed, a forward bracket 13c for $3^{rd}$ speed, and a forward bracket 13d for $1^{st}$, speed and $5^{th}$ speed.

In this case, as shown in FIG. 20, when the selecting operation toward the reverse stage side in performed, the neutral position of said shifter 16 is set to be in a position sliding from the center position by the measurement $-S_0$, the reverse position of said shifter 16 being set to be in a position sliding from the center position by the measurement $+S_0$, and further the slide measurement $-S_0$ of said shifter 16 from the center position to the neutral position is set to be substantially the same as the slide measurement $+S_0$ of said shifter 16 from the center position to the reverse position in absolute value.

Further, as shown in FIG. 20, when the selecting operation toward the forward stage side is performed, the neutral position of said shifter 16 is set to be at center, the shifting position $2^{nd}$, $5^{th}$, $6^{th}$ speed shifting position which is the shifting position on one side in the first stage shifting is set to be a position sliding from the center position in $-S_0$, and $1^{st}$, $3^{rd}$, $4^{th}$ shifting position of said shifter 16 which is the shifting position on the other side in the first stage shifting is set to be in a position sliding from the center position in $+S_0$.

[Reverse Stage Side Shifting]

In said transmission 1, in a case where the shift operation to the reverse stage side is performed, the shift lever (not shown in Figures) is first select-operated to the reverse stage side, to select rotate said actuator rod 3 to the reverse position, so as to engage said shifter 16 carried on said actuator rod 3 with said reverse bracket 5 (see FIGS. 20 and 21).

Following that, by shift-operating the shift lever to start up said actuator 2, said actuator rod 3 is slid by said actuator 2 so as to slide said shifter 16 from its neutral position to reverse position, the shifting to the reverse stage being completed.

[Forward Stage Side Shifting]

In said transmission 1, in a case where shifting to the forward stage side (such as $1^{st}$ speed and $2^{nd}$ speed) is performed, the shift lever is first select-operated toward the forward stage side, to select-rotate said actuator rod 3 to the forward position, so as to engage said shifter 16 carried on said actuator rod 3 with said forward bracket 13 (see FIGS. 20 and 21).

Following this, by shift-operating the shift lever to start up said actuator 2, and said actuator rod 3 is slid by said actuator 2 to shift slide said shifter 16 from its neutral position to $1^{st}$ speed position (odd numbered speed position) or $2^{nd}$ speed position (even numbered speed position ), the shifting to the forward stage being completed.

Figure 22:
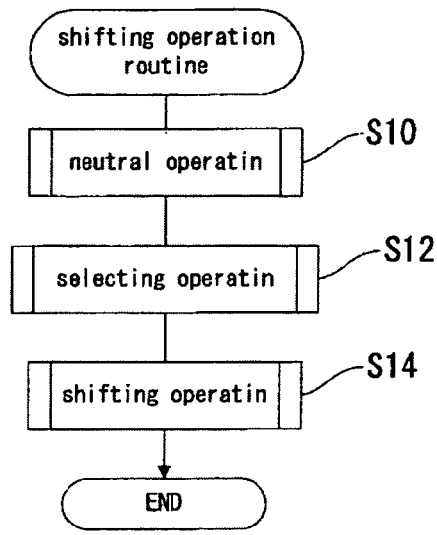
FIG. 22 is a flowchart of the shifting operation routine in EXAMPLE 4.

Hereinafter, the movement of said automatic shift type manual transmission 1 of this EXAMPLE, particularly the movement in shifting is described. FIG. 22 is a flow chart showing an example of the shift procedure routine practiced by said actuator control unit (hereafter ACU)2a. This routine is practiced when the transmission is instructed to shift.

Figure 23:
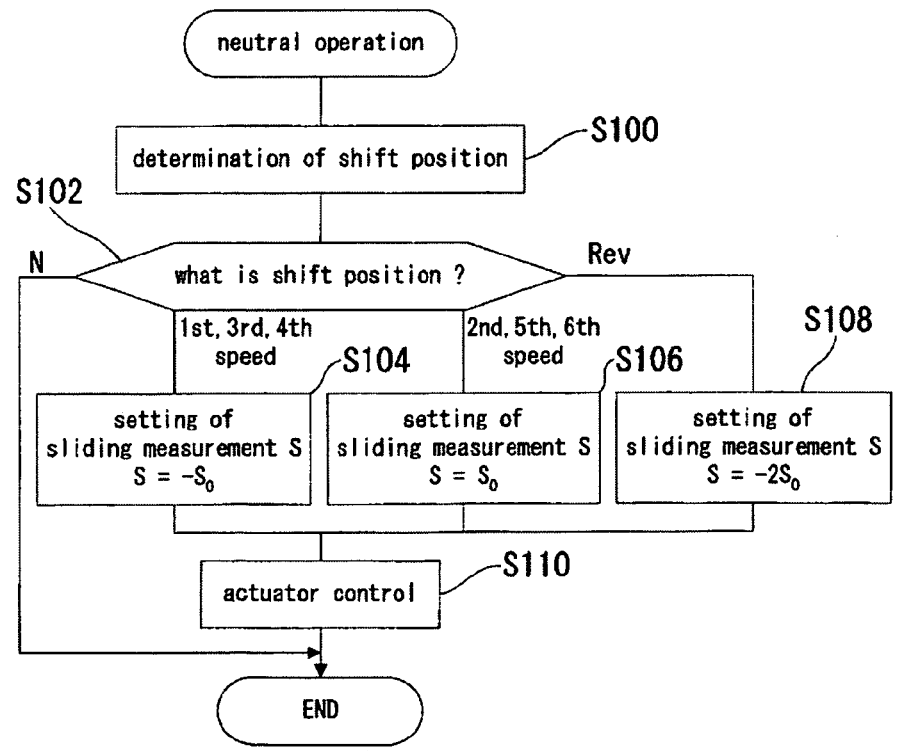
FIG. 23 is a flowchart of the neutral operation in EXAMPLE 4.
Figure 24:
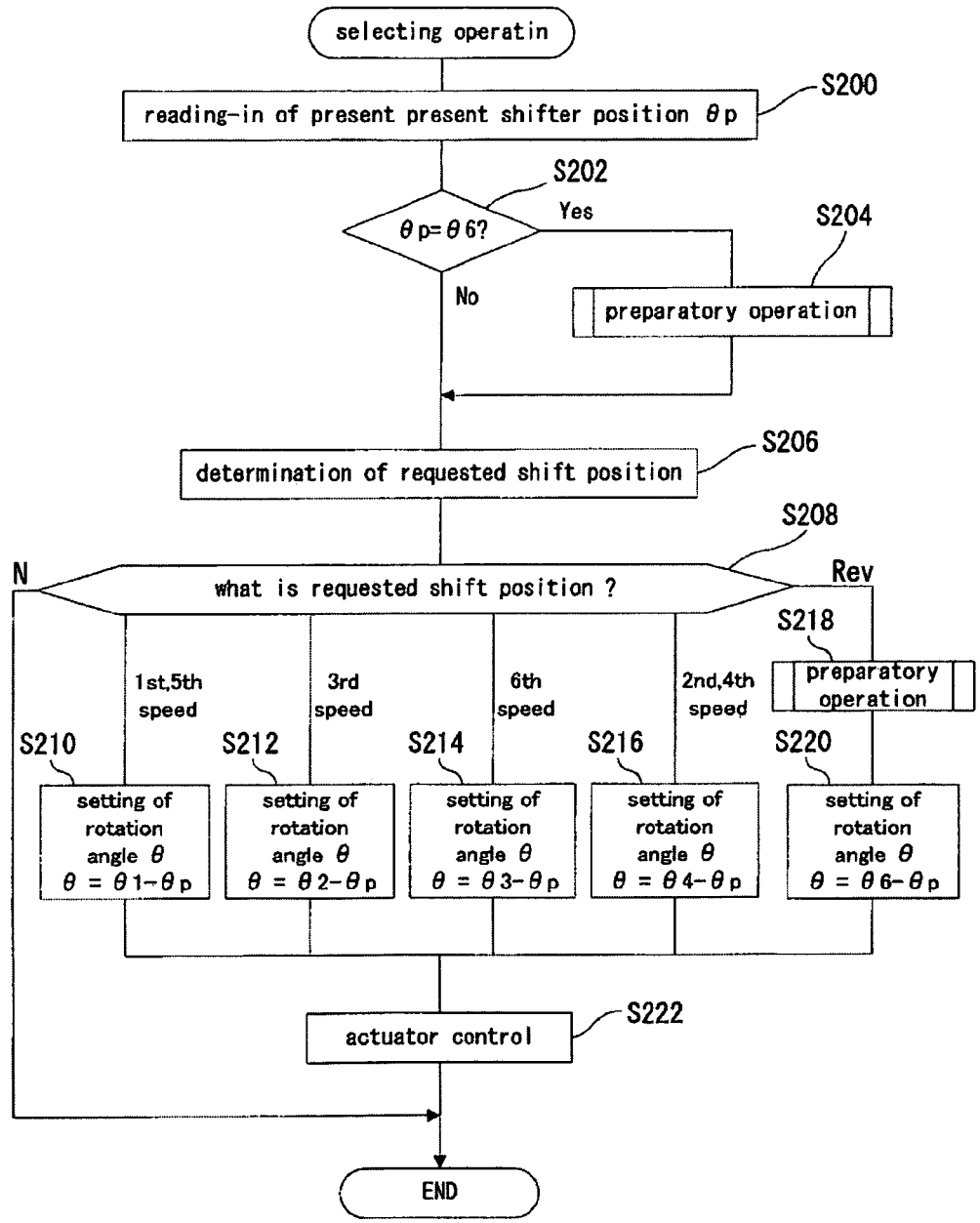
FIG. 24 is a flowchart of the selecting operation in EXAMPLE 4.
Figure 26:
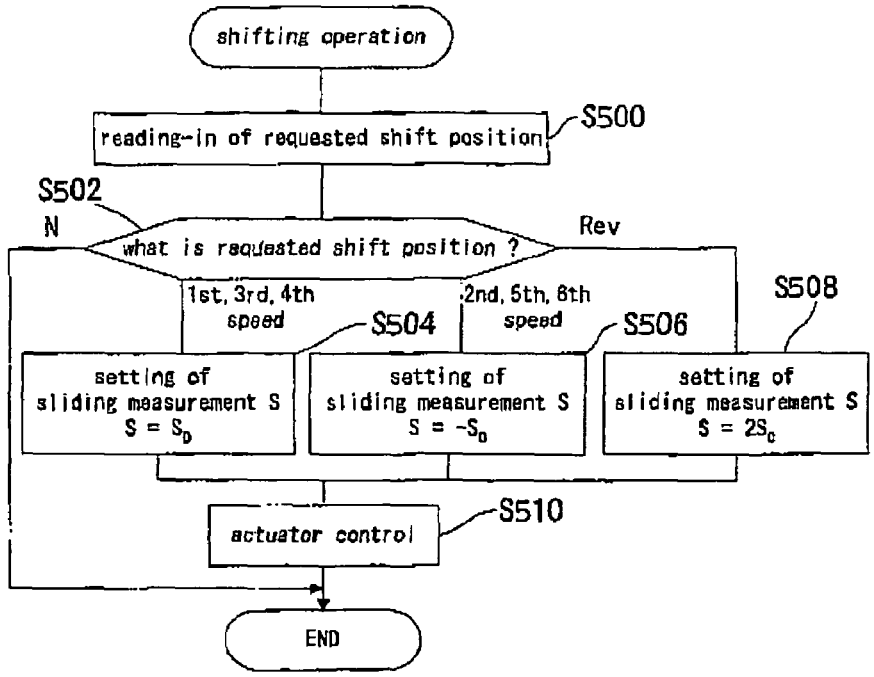
FIG. 26 is a flowchart of the shifting operation in EXAMPLE 4.

When said shift procedure routine is practiced, the CPU of ACU2a first practices the neutral procedure as illustrated in FIG. 23 (Step S10), then practices the select-procedure as illustrated in FIG. 24 (Step S12), and the shift-procedure as illustrated in FIG. 26 (Step S14), in turn.

In the neutral procedure, as shown in FIG. 23, the CPU of ACU2a practices the procedure of determining present position (Step S100). This determination can be performed by the signal from the shift position sensors (not shown in Figures) equipped in each shifting stage.

When the present shift position is determined to be any of the $1^{st}$, $3^{rd}$, or $4^{th}$ speed position, the slide measurement S of said actuator rod 3 is set to be $-S_0$ so as to put said shifter 16 at its neutral position in the forward stage (Step S104), said actuator 2 being controlled so that the slide measurement of said actuator rod 3 is to be set as described above (Step S110), completing the procedure.

Similarly, when the present shift position is determined to be any of the $2^{nd}$, $4^{th}$, or $5^{th}$ speed position, the slide measurement S of said actuator rod 3 is set to be So (Step S106), when the present shift position is determined to be the reverse position (Rev), the slide measurement S of said actuator rod 3 is set to be $-2S_0$ (Step S108), said actuator 2 being controlled so as to slide said actuator rod 3 in each slide measurement set as described above (Step S110), completing the procedure.

In the selecting procedure, as shown in FIG.24, the CPU of ACU2a reads in the present position $θ_p$ of said shifter 16 (Step S200), and at the same time said CPU performs the procedure of determining whether the position $\theta_p$ of said shifter 16 is at the reverse position $\theta 6$ or not (Step S202).

The above described procedure of reading in the present position $\theta_p$ of the shifter is performed by such as reading in the signal from the rotation angle sensor 3b attached to said actuator rod 3.

When the position $\theta_p$ of said shifter 16 is not determined to be the reverse position $\theta$, the determination of the instructed and requested shift position is performed (Step S206). The determination of said requested shift position can be performed by such as the signal based on the shift operation by the driver.

When said request position is determined to be the $1^{st}$, $5^{th}$ speed position, the rotation angle $\theta$ of said actuator rod 3 is set to be $\theta 1 - \theta_p$ so as to rotate said shifter 16 to the $1^{st}$, $5^{th}$ speed position $\theta$ (Step S210), said actuator 2 being controlled so as to rotate said actuator rod 3 at a rotation angle $\theta$ set as described above (Step S222), completing the procedure.

Similarly, when said requested shift position is determined to be the $3^{rd}$ speed position, the rotation angle $\theta$ of said actuator rod 3 is set to be $\theta 2 - \theta_p$ (Step S212), when said requested shift position is determined to be the $6^{th}$ speed position, the rotation angle $\theta$ of said actuator rod 3 is set to be $\theta 3 - \theta_p$ (Step S214), and when said requested shift position is determined to be the $2^{nd}$, $4^{th}$ speed position, the rotation angle $\theta$ of said actuator rod 3 is set to be $\theta 4 - \theta_p$ (Step S216), said actuator 2 being controlled so as to rotate said actuator rod 3 at each rotation angle $\theta$ set as described above (Step S222), completing the procedure.

When said requested shift position is determined to be the reverse position (Rev), the preparatory procedure for shifting toward the reverse stage is performed (Step S218).

Figure 25:
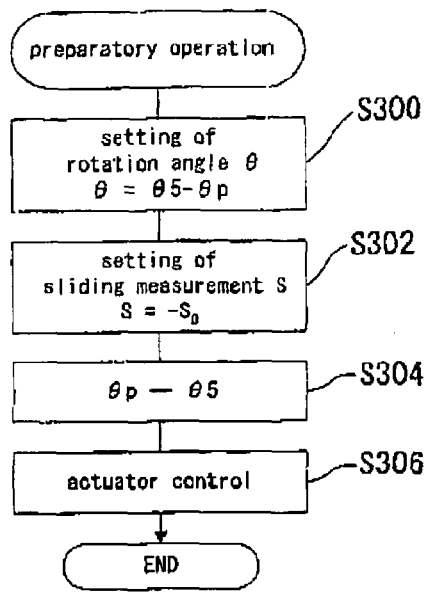
FIG. 25 is a flowchart of the preparatory operation in EXAMPLE 4.

In said preparatory procedure, as shown in FIG. 25, to release said shifter 16 from all forward bracket 13a to 13d, the rotation angle $\theta$ of said actuator rod 3 is set to be $\theta 5 - \theta_p$ so that the position of said shifter 16 is to be at position $\theta 5$ (Step S300), and at the same time the slide measurement of said actuator rod 3 is set to be $-S_0$ so as to put said shifter 16 at its neutral position in the reverse stage (Step S302), and thus the procedure to replace the present position of said shifter 16 $\theta_p$ to $\theta 5$ is performed (Step S304).

Herein, the position $\theta 5$ of said shifter 16 is set to be between said forward bracket 13a, and said reverse bracket 5, wherein said shifter 16 does not interfere with said forward bracket 13a and said reverse bracket 5 when said shifter 16 slides.

Said actuator 2 is then controlled so as to operate said actuator rod 3 at a rotation angle $\theta$ and in a slide measurement S set as described above, (Step S306), completing the procedure.

When said preparatory procedure is completed, the rotation angle $\theta$ of said actuator rod 3 is set to be $\theta 6 - \theta_p$ so as to rotate said shifter 16 to the reverse position $\theta 6$ (Step 220), said actuator 2 being controlled so as to rotate actuator rod 3 at a rotation angle $\theta$ set as described above (Step S222), completing the procedure.

Further, when the present position of said shifter $\theta_p$ is determined to be $\theta 6$ in Step S202, the preparatory procedure to put said shifter 16 at its neutral position in the forward stage is practiced to prepare for shifting to the requested shifting stage (in this case with the exception of the reverse shifting stage) (Step S204).

In this preparation treatment, the same as described above, as shown in FIG. 25, the rotation angle $\theta$ of said actuator rod 3 is set to be $\theta 5 - \theta_p$, and the slide measurement S of said actuator rod 3 is set to be So, and the present position of said shifter 16 $\theta_p$ is replaced to $\theta 5$, said actuator 2 being controlled so as to operate said actuator rod 3 in a slide measurement S, and a rotation angle $\theta$, set as described above (Step S300 to S306).

When said preparatory procedure is completed, the same described above, the determination of the requested shift position is performed to set the rotation angle $\theta$ of said actuator rod 3 according to the requested shift position, and the procedure of controlling said actuator 2 so as to rotate said actuator rod 3 at a rotation angle $\theta$ set as described above is practiced (Step S206 to S214, Step S222).

In the shift operation, as shown in FIG. 26, the CPU of ACU2a performs the reading in of said requested shift position (Step S500) and then practices the procedure of determining said requested shift position (Step S502).

When said requested shift position is determined to be the $1^{st}$, $3^{rd}$, $4^{th}$ speed position, the slide measurement S of said actuator rod 3 is set to be So (Step S504), said actuator 2 being controlled so as to slide said actuator rod 3 in a slide measurement S set as described above (Step S510), completing the procedure.

Similarly, when the requested shift position is determined to be the $2^{nd}$, $5^{th}$, $6^{th}$ speed position, the slide measurement of said actuator rod 3 is set to be $-S_0$, so as to be the requested shift position (Step S506), and when said requested shift position is determined to be the reverse position (Rev), the slide measurement S is set to be $2S_0$ so as to be the reverse shifting (Step S508), said actuator 2 controlled so as to slide said actuator rod 3 in each slide measurement set as described above, completing the procedure.

In said automatic shift type manual transmission 1, the same effects as said transmissions of EXAMPLES 1 to 3 are practiced.

Herein above, the embodiments of the present invention are described by said EXAMPLES but the scope of the present invention is not limited by the disclosures of said EXAMPLES, and alterations and modifications can be done in the scope described in Claims.

For instance, in EXAMPLES 2 to 4, the $1^{st}$, $3^{rd}$, $4^{th}$ speed shifting positions are arranged in the first shifting position of said forward shifter 12 (the shifting stage on one side of the first stage side of the first shifter 12), and the $2^{nd}$, $5^{th}$, $6^{th}$ speed shifting positions are arranged in the second shifting position of said forward shifter 12, (the shifting stage on the other side of the first stage side of the first shifter 12), but in the present invention, any arrangement of the shifting positions such as the arrangement of the shifting positions being divided into even and odd numbered speed shifting positions may be included.

Further, in said EXAMPLES 1 to 3, the neutral position of said reverse shifter 4 is set to be in a position pivoting toward a side from a vertical position to said actuator rod 3, the reverse position of said reverse shifter 4 being set to be in a position pivoting toward the other side from a vertical position to said actuator rod 3, but aside from said EXAMPLES, in the present invention, the neutral position and/or the reverse position of said reverse shifter 4 may be set at any position so far as the shift stroke measurement in the reverse shift stage is increased, as compared to the shift stroke measurement in the forward shift stage.

Furthermore, in the above described EXAMPLE, and EXAMPLE 2, the rotation angle $\theta$ of said reverse shifter 4 from a vertical position to said actuator rod 3 to its neutral position, is set to be substantially equal to the rotation angle $\theta$ of said reverse shifter 4 from a vertical position to said actuator rod 3 to the reverse position, but aside from said EXAMPLES, the rotation angle of said reverse shifter 4 from a vertical position to said actuator rod 3 to its neutral position may not always need to be set to be equal to the rotation angle of said reverse shifter 4 from a vertical position to said actuator rod 3 to the reverse position, and the rotation angles of said reverse shifter 4 to its neutral position or the reverse position may be set to be any angle so far as the shift stroke measurement in the reverse shifting stage is increased compared to the shift stroke measurement in the forward shifting stage.

Still further, in EXAMPLES 1 and 2, the length L of said reverse shifter 4 is set to be substantially equal to the length L of said forward shifter 12, but aside from said EXAMPLES, the shift stroke measurement in the reverse shift stage can be increased as compared to the shift stroke measurement in forward shift stage, and so far as the downsizing of the transmission can be realized, and so far as there is no problem in the strength, the length of said reverse shifter 4 may be set to be longer than the length of said forward shifter 12, and also the length of said reverse shifter 4 may be set to be shorter than the length of said forward shifter 12.

Additionally, in EXAMPLES 1 to 4, the first stage side is set to be the forward shifting stage and the second stage side is set to be the reverse shifting stage. Aside from said examples, the first stage side and the second stage side may be set to be any shifting stage, for example, the first stage side may be set to be an even numbered speed shifting stage ($2^{nd}$ speed, $4^{th}$ speed, $6^{th}$ speed), and the second stage side may be set to be an odd numbered speed shifting stage ($1^{st}$ speed, $3^{rd}$ speed, $5^{th}$ speed).

Addition to this, in EXAMPLES 1 and 2, two shifters are equipped, a forward shifter and a reverse shifter, and in EXAMPLES 3 and 4, one shifter is equipped to be used both as a forward shifter and reverse shifter, but any number of shifters can be equipped, even more than three shifters, so far as the downsizing of the transmission can be realized.

POSSIBILITY OF INDUSTRIAL USE

In the present invention, the structural complications of the transmission can be avoided, and downsizing of the transmission can be realized, so that the automatic shift type manual transmission of the present invention can be used industrially, such as in an automobile.

The invention claimed is:

1. An automatic shift manual transmission equipped with a forward shifter to perform forward stage shifting, a reverse shifter to perform reverse stage shifting, an actuator rod carrying said forward shifter and said reverse shifter, and an actuator to operate said actuator rod according to a shift operation of a shift lever, wherein a shifter length of said reverse shifter is set to be substantially the same as a shifter length of said forward shifter, and a reverse stage shift stroke measurement is set to be comparatively larger than a forward stage shift stroke measurement by allowing a difference in an operating measurement of said actuator rod, and said actuator rod is set to be rotated by said actuator according to the shift operation of said shift lever, a neutral position of said reverse shifter being set to be in a position pivoting toward one side from a vertical position to said actuator rod with a reverse position of said reverse shifter being set to be in a position pivoting toward the other side from the vertical position to said actuator rod.

2. An automatic shift manual transmission in accordance with claim 1, wherein a neutral position of said forward shifter is set to be in the vertical position to said actuator rod, a first stage side shift position of said forward shifter being set to be in a position pivoting toward one side from the vertical position to said actuator rod, with a second stage side shift position being set to be in a position pivoting toward the other side from the vertical position to said actuator rod.

3. An automatic shift manual transmission in accordance with claim 2, wherein a rotation angle of said reverse shifter from the neutral position to the reverse position is set to be substantially the same as a rotation angle of said forward shifter from the first stage side shift position to the second stage side shirt position.

4. An automatic shift manual transmission in accordance with claim 1, wherein a rotation angle of said reverse shifter to the neutral position is set to be substantially the same as a rotation angle of said reverse shifter to the reverse position.

5. An automatic shift manual transmission in accordance with claim 2, wherein a rotation angle of said reverse shifter to the neutral position is set to be substantially the same as a rotation angle of said reverse shifter to the reverse position.

6. An automatic shift manual transmission in accordance with claim 3, wherein a rotation angle of said reverse shifter to the neutral position is set to be substantially the same as a rotation angle of said reverse shifter to the reverse position.

7. An automatic shift manual transmission equipped with a shifter to perform shifting, an actuator rod carrying said shifter, an actuator to operate said actuator rod according to a shift operation of a shift lever, and a drive control system to control an operation of said actuator so that an operating measurement of said actuator rod when shifting toward a second stage side is performed is set to be larger than an operating measurement of said actuator rod when shifting toward a first stage side is performed, wherein said actuator rod is set to be rotated by said actuator according to the shift operation of said shift lever, and said drive control system is set to control said actuator so that a neutral position in the second stage side of said shifter pivots toward one side from a vertical position to said actuator rod, and a shift position in the second stage side pivots toward the other side from the vertical position to said actuator rod when shifting toward the second stage side is performed.

8. An automatic shift manual transmission in accordance with claim 7, wherein said drive control system is set to control said actuator so that a neutral position in the first stage side of said shifter is set to be in a position being vertical to said actuator rod when shifting toward the first stage side is performed, and a shift position in the first stage side of said shifter is set to be in a position pivoting toward one or the other side from the vertical position to said actuator rod.

9. An automatic shift manual transmission in accordance with claim 8, wherein said drive control system is set to control said actuator so that when shifting toward the second stage side is performed, a rotation angle of said actuator rod from the neutral position in the second stage side to the shift position in the second stage side is set to be substantially the same as a rotation angle of said shifter from the position pivoting toward one side from the vertical position to said actuator rod to the position pivoting toward the other side from the vertical position to said actuator rod when shifting toward the first stage side is performed.

10. An automatic shift manual transmission in accordance with claim 7, wherein said drive control system is set to control said actuator so that when shifting toward the second stage side is performed a rotation angle of said shifter from the vertical position to said actuator rod to the neutral position in the second stage side is set to be substantially the same as a rotation angle of said shifter from the vertical position to said actuator rod to the shift position of said shifter in the second stage side.

11. An automatic shift manual transmission in accordance with claim 7, wherein said shifter includes a first shifter to perform shifting toward the first stage side and a second shifter to perform shifting toward the second stage side.

12. An automatic shift manual transmission in accordance with claim 11, wherein a length of said first shifter is set to be substantially the same as a length of said second shifter 13. An automatic shift manual transmission in accordance with claim 7, wherein the first stage side is a forward shifting stage, and the second stage side is a reverse shifting stage.

14. An automatic shift manual transmission in accordance with claim 8, wherein said drive control system is set to control said actuator so that when shifting toward the second stage side is performed a rotation angle of said shifter from the vertical position to said actuator rod to the neutral position in the second stage side is set to be substantially the same as a rotation angle of said shifter from the vertical position to said actuator rod to the shift position of said shifter in the second stage side.

\* \* \* \* \*